(12) United States Patent
Clarridge

(10) Patent No.: US 11,815,364 B2
(45) Date of Patent: Nov. 14, 2023

(54) ENVIRONMENTAL CONDITION SENSOR WITH COMPONENT DIAGNOSTICS AND OPTICALLY COMMUNICATED STATUS

(71) Applicant: Ronald P. Clarridge, Webster, NY (US)

(72) Inventor: Ronald P. Clarridge, Webster, NY (US)

( * ) Notice: Subject to any disclaimer, the term of this patent is extended or adjusted under 35 U.S.C. 154(b) by 244 days.

(21) Appl. No.: 17/140,050

(22) Filed: Jan. 2, 2021

(65) Prior Publication Data

US 2021/0250090 A1    Aug. 12, 2021

Related U.S. Application Data

(60) Provisional application No. 62/957,155, filed on Jan. 4, 2020.

(51) Int. Cl.
     *G01D 21/02*      (2006.01)
     *H04W 4/38*      (2018.01)

(52) U.S. Cl.
     CPC ............... *G01D 21/02* (2013.01); *H04W 4/38* (2018.02)

(58) Field of Classification Search
     CPC .......... G01D 21/02; H04W 4/38; G08C 23/04
     See application file for complete search history.

(56) References Cited

U.S. PATENT DOCUMENTS

| | | | |
|---|---|---|---|
| 2003/0148636 A1* | 8/2003 | Henry | G01D 11/24 340/693.5 |
| 2004/0172954 A1* | 9/2004 | Hanson | F25D 29/003 62/126 |
| 2012/0286951 A1* | 11/2012 | Hess | G08B 25/008 340/539.1 |
| 2016/0327921 A1* | 11/2016 | Ribbich | F24F 11/30 |
| 2019/0055835 A1* | 2/2019 | Brookes | E21B 47/047 |
| 2019/0320244 A1* | 10/2019 | Albers | G01N 29/50 |
| 2019/0387290 A1* | 12/2019 | Hedlund | H04Q 9/00 |

* cited by examiner

*Primary Examiner* — Thomas S McCormack
(74) *Attorney, Agent, or Firm* — Michael J. Nickerson; Dawson Law Firm, PC

(57) ABSTRACT

An environmental condition sensor device includes a microprocessor; a condition sensor, operatively connected to the microprocessor, to measure a condition of a system being monitored; and an optical output interface, operatively connected to the microprocessor, to produce light to optically communicate a measured condition of the system being monitored. The optical output interface can also produce light to optically communicate a status of the environmental condition sensor device being non-operational. The optical output interface can also produce light to optically communicate that the condition sensor is non-operational.

21 Claims, 21 Drawing Sheets

1000

1100

ENVIRONMENTAL CONDITION SENSOR WITH COMPONENT DIAGNOSTICS AND OPTICALLY COMMUNICATED STATUS

PRIORITY INFORMATION

This application claims priority from U.S. Provisional Patent Application, Ser. No. 62/957,155, filed on Jan. 4, 2020. The entire content of U.S. Provisional Patent Application, Ser. No. 62/957,155, filed on Jan. 4, 2020, is hereby incorporated by reference.

BACKGROUND

Conventionally, an environmental condition sensor device, which measures environmental condition(s) (pressure, temperature, humidity, concentration, flow-rate, contaminant, etc.) of a system or a predefined environment, as illustrated in FIG. 1, includes an environmental condition system interface 2 to connect the environmental condition sensor to a system being monitored. The system interface 2 includes an interface (not shown) that allows the environmental condition (pressure, temperature, humidity, concentration, flow-rate, contaminant, etc.) being monitored to interface with an environmental condition sensor within the environmental condition sensor device.

The environmental condition sensor (not shown) and associated circuitry (not shown) are located within a sensor housing 1. The sensor housing 1 is conventionally connected (sealed) to the system interface 2 such that when the sensor housing 1 is rotated, the system interface 2 is also rotated.

The rigid connection between the sensor housing 1 and the system interface 2 can cause the sensor housing 1 to break away from the system interface 2 when tightening/coupling the system interface 2 to the system being monitored or when decoupling the system interface 2 to the system being monitored, thereby requiring the environmental condition sensor device to be replaced even though the environmental condition sensor and associated circuitry are still capable of being operational.

Moreover, conventional environmental condition sensor devices include various electronic components that provide the function of measuring the environmental condition being monitored.

For example, a conventional environmental condition sensor device may include a Wheatstone bridge circuit to enable the measurement of the pressure or other environmental condition of the system being monitored. The Wheatstone bridge circuit may be constructed of resistors, capacitors, and/or other impedance components, which are susceptible to failure, to enable the measurement of the specific environmental condition of the system being monitored.

It is noted that a conventional environmental condition sensor device may include other devices, which measure electrical signals, a laser's position, infrared, etc., to enable the measurement of the environmental condition of the system being monitored. The components of these devices are constructed of components, which are susceptible to failure. Thus, these components should be regularly tested to ensure the proper operability of the environmental condition sensor device.

Conventionally to test the components within the environmental condition sensor device, the environmental condition sensor device is removed from the system being monitored and connected to a bench testing device, for reference purposes.

This process requires the removal of the environmental condition sensor device from the system or device being monitored, which exposes the environmental condition sensor device to the possibility of damage from the decoupling process and/or transportation of the environmental condition sensor device to the bench testing device. Additionally, the removal of the environmental condition sensor device from the system or device being monitored which exposes the environmental condition sensor device to the possibility of damage from the disconnection and/or connection process.

Moreover, by requiring the environmental condition sensor device to be removed from the system for testing by a bench testing device, the operator must routinely remove the environmental condition sensor device for testing because the conventional environmental condition sensor devices do not have the capability to individually notify the operator of a probability of a failure while connected to the system being monitored, thereby adding to downtime for the system being monitored.

Therefore, it is desirable to provide an environmental condition sensor device that has a system interface which is not rigidly connected to the sensor housing.

Also, it is desirable to provide an environmental condition sensor device that has a system interface which is not rigidly connected to the sensor housing to reduce the likelihood of damage.

Furthermore, it is desirable to provide an environmental condition sensor device that has a system interface which is not rigidly connected to the sensor housing to improve long term reliability of the installed environmental condition sensor device.

It is further desirable to provide an environmental condition sensor device that internally tests the components of the environmental condition sensor.

Moreover, it is desirable to provide an environmental condition sensor device that internally tests the components of the environmental condition sensor and communicates the status of the tested components.

It is also desirable to provide an environmental condition sensor device that internally tests the components of the environmental condition sensor to a known reference or physical property and communicates the status of the tested components with respect to the referenced conditions.

Furthermore, it is desirable to provide an environmental condition sensor device that internally monitors the components of the environmental condition sensor and creates an event log for the monitored component of the environmental condition sensor.

It is desirable to provide an environmental condition sensor device that internally monitors the components of the environmental condition sensor and creates a sensor health log for the monitored component of the environmental condition sensor.

It is also desirable to provide an environmental condition sensor device that internally monitors the components of the environmental condition sensor and creates a sensor usability log for the monitored component of the environmental condition sensor.

Additionally, it is desirable to provide an environmental condition sensor device that internally tests the components of the environmental condition sensor and optically (visually) communicates the status of the tested components.

It is also desirable to provide an environmental condition sensor device that internally tests the components of the environmental condition sensor and utilize a LED to communicate the status of the tested components.

It is desirable to provide an environmental condition sensor device system that allows one environmental condition sensor device to interrogate the other environmental condition sensor devices so that the status of each environmental condition sensor device can be collected at one environmental condition sensor device.

It is also desirable to provide an environmental condition sensor device system that allows one environmental condition sensor device to interrogate the other environmental condition sensor devices so that the status of each environmental condition sensor device can be collected at one environmental condition sensor device for redundancy and failure analysis.

Additionally, it is desirable to provide a network of environmental condition sensor devices that allows each environmental condition sensor device to be interrogated so that the status of each environmental condition sensor device can be communicated.

Lastly, it is desirable to provide a network of environmental condition sensor devices that allows each environmental condition sensor device to be interrogated so that the health status of the network of environmental condition sensor devices can be communicated.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
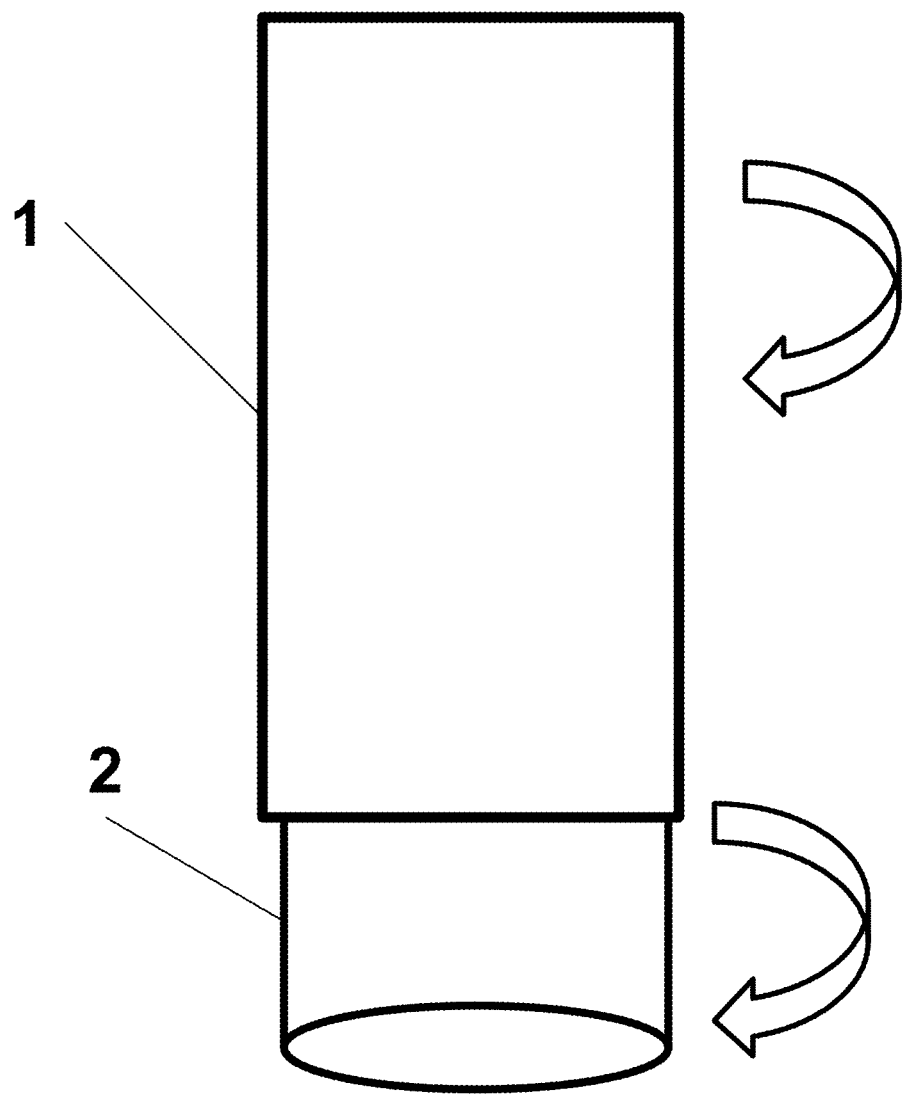
FIG. 1 illustrates an example of a conventional environmental condition sensor device.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
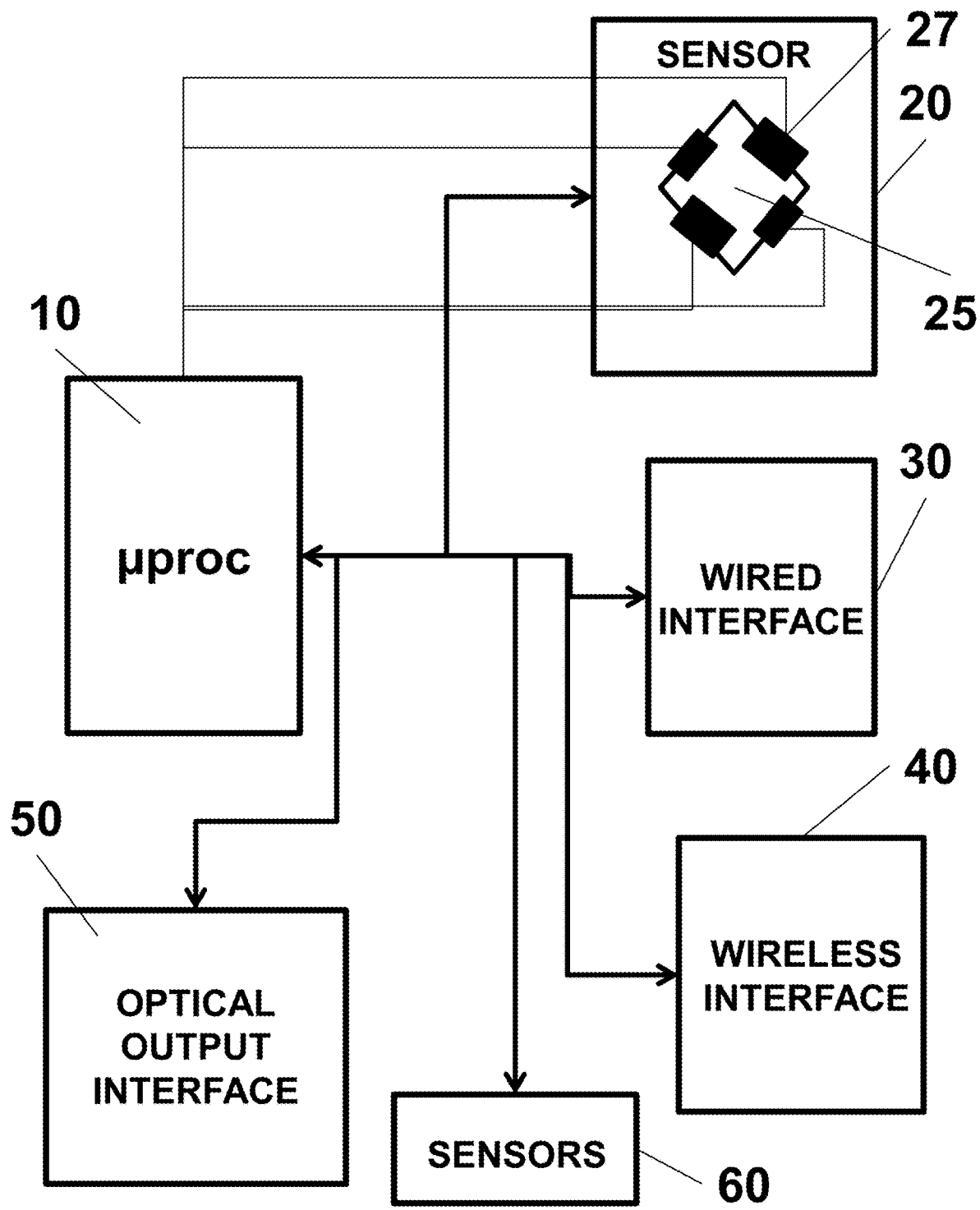
FIG. 2 illustrates a block diagram of environmental condition sensor system.

FIG. 2 illustrates a block diagram of environmental condition sensor system. As illustrated in FIG. 2, the environmental condition sensor system includes a microprocessor 10, operatively connected to an environmental condition sensor 20. The environmental condition sensor 20 may include a Wheatstone bridge circuit 25 constructed of various impedance or electronic components 27.

For example, the Wheatstone bridge circuit 25 may be constructed of various resistor or electronic components 27 to measure a pressure within a system being monitored.

It is noted that the environmental condition sensor 20 may contain other components that measure other characteristics, not just impedance, such as electrical signals, physical interfaces, a laser's position, infrared, other light characteristics, etc.

As illustrated in FIG. 2, the environmental condition sensor system further includes a wired communication interface 30, operatively connected to the microprocessor 10, to provide wired communication between the environmental condition sensor system and another device or another environmental condition sensor system to provide for the communication of data and/or errors. The wired communication interface 30 may be a USB port, a RJ-45 port, a RCA port, etc.

The environmental condition sensor system further includes a wireless communication interface 40, operatively connected to the microprocessor 10, to provide wireless communication between the environmental condition sensor system and another device or another environmental condition sensor system to provide for the communication of data and/or errors.

The environmental condition sensor system also includes an optical output interface 50, such as a LED or other colored optical communication components, operatively connected to the microprocessor 10, to optically (visually) communicate, to an operator, the status of components within the environmental condition sensor system. The optical output interface 50 can also optically (visually) communicate, to an operator, the status of a condition of the system being monitored; e.g., communicate that the pressure for the system being monitored is within a predetermined range or outside the predetermined range.

For example, if the condition of the system being monitored is within the predetermined range, the optical output interface 50 may produce a green light. Alternatively, if the condition of the system being monitored is outside the predetermined range, the optical output interface 50 may produce a red light.

In addition, if the condition of the system being monitored is within the predetermined range, the optical output interface 50 may produce a visual "Go" signal, and if the condition of the system being monitored is outside the predetermined range, the optical output interface 50 may produce a visual "No Go" signal.

Also, if the condition of the system being monitored is within the predetermined range but within a second predetermined range of being outside of the predetermined range, the optical output interface 50 may produce a yellow light.

As illustrated in FIG. 2, the microprocessor 10 is operatively connected to the various impedance or electronic components 27 of the Wheatstone bridge circuit 25. The microprocessor 10 tests each impedance or electronic component 27 to determine if the component is within a specified range. The testing is done at ambient conditions or a known condition (expected reference range).

If the microprocessor 10 determines that a component is outside a pre-determined specified range, the microprocessor can communicate, through the optical output interface 50, the non-compliant status of the environmental condition sensor or the individual component so that an operator can visually inspect the environmental condition sensor device for compliance.

In other words, the microprocessor 10 causes the environmental condition sensor or the individual component to be tested and the failure or success of the test is communicated in a visual fashion.

Moreover, the microprocessor can communicate the non-compliant status of the environmental condition sensor or the individual component through the wired communication interface 30 or the wireless communication interface 40 to another environmental condition sensor device.

It is noted that the communication of the non-compliant status of the environmental condition sensor or the individual component can be encrypted.

The wireless communication interface 40 can utilized a low power communication protocol, such as Bluetooth™ or higher power wireless communication protocols. The wireless communications can be encrypted.

The wireless communication interface 40 enables wireless communications with a smartphone, a personal digital assistant device, a portable calibration and verification device, a central monitoring system, or other smart/wireless devices.

If the microprocessor 10 determines that a component is within a pre-determined specified range, the microprocessor can communicate, through the optical output interface 50, the compliance status of the environmental condition sensor or the individual component so that an operator can visually inspect the environmental condition sensor device for compliance.

In other words, the microprocessor 10 enables a remote/in-place calibration of the environmental condition sensor or the individual component.

Moreover, the microprocessor 10 may communicate the compliance status of the environmental condition sensor or the individual component through the wired communication interface 30 or the wireless communication interface 40 to another environmental condition sensor device.

In communicating, using the optical output interface 50, the status of the environmental condition sensor or the individual component, the optical output interface 50 produces different colors to communicate the status of the environmental condition sensor or the individual component.

For example, the optical output interface 50 may produce a green color (status color) when the environmental condition sensor or the individual component is in compliance or may produce a red color (status color) when the environmental condition sensor or the individual component is not in compliance.

The microprocessor 10 may also determine if the component is within a certain pre-determined range of becoming non-compliant, and thus, the optical output interface 50 may produce a yellow color (status color) when the environmental condition sensor or the individual component is within a certain pre-determined range of becoming non-compliant.

As noted above, the microprocessor 10 enables a remote/in-place calibration of the environmental condition sensor or the individual component.

It is further noted that the illumination produced by the optical output interface 50 may also specifically identify the component that is not in compliance.

For example, the optical output interface 50 may produce three rapid flashes of red color to indicate that the third component 27 of the sensor 20 is not in compliance.

Alternatively, the optical output interface 50 may produce a non-status color (such as purple, brown, orange, blue, etc.), wherein the produced non-status color represents a specific component, followed by a status color (red, yellow, and/or green).

The illuminated status produced by the optical output interface 50 can be realized by a pulse width modulation circuit (not shown) that controls the illumination parameters of optical devices (such as LEDs) producing the colors.

It is noted that the illuminated status produced by the optical output interface 50 can be related to the pulse, frequency, color, or other illumination characteristic of the light produced by the optical output interface 50.

The optical output interface 50 enables the visual communication of status conditions of the environmental condition sensor without creating alphanumeric characters.

Moreover, by producing the visual communication of status conditions of the environmental condition sensor without creating alphanumeric characters, the visual communication of status conditions of the environmental condition sensor can be communicated over a longer distance because the resolving of alphanumeric characters is not required.

Thus, the status conditions of a remotely located environmental condition sensor device can be easily communicated, visually, to the operator.

By allowing the optical output interface 50 to illuminate the status of the environmental condition sensor device, an operator can "walk" the system and visually inspect the status of each environmental condition sensor device without having to remove an environmental condition sensor device from the system being monitored to be tested for compliance.

In other words, the optical output interface 50 visually communicates (alerts), through dynamic colored light(s), to the operator, of possible out of calibration or compromised conditions.

It is noted that the microprocessor 10 may continually monitor the status of the components and create an event log to assist an operator better understand the timing of the component failure as well as other conditions that may have been present at the time of failure.

This event log can be electronically communicated via the wired communication interface 30 or the wireless communication interface 40.

Although the microprocessor 10 has been described as monitoring a status of a component within the environmental condition sensor device, the microprocessor 10 may also be operatively connected to a set of sensors 60 that monitor the environment of the environmental condition sensor device, such as the temperature of the environmental condition sensor device or the vibrations (strength, frequency, duration, etc.) that the environmental condition sensor device is experiencing. The monitoring of the environment of the environmental condition sensor device enables the microprocessor 10 to determine failure probability of the environmental condition sensor device or the components therein, as well as, failure analysis of the environmental condition sensor device or the components therein.

If the environmental condition sensor device is experiencing a high temperature, the high temperature could cause the sensor components to drift or operate outside of an acceptable range. In addition, the sensor components of the environmental condition sensor device can become damaged due to strong vibrations, etc.

The monitoring of the environment of the environmental condition sensor device enables the microprocessor 10 to predict a possible failure of the environmental condition sensor device. The optical output interface 50 can also be utilized to communicate the potential failure of the environmental condition sensor device due to the environmental conditions being experienced by the environmental condition sensor device.

With respect to the environmental condition sensor system, the environmental condition sensor devices may be located in an environment where wireless communications are not desired or permitted.

To ensure compliance in such situations, the microprocessor 10 monitors a connection to the wired communication interface 30. If a connection to the wired communication interface 30 is detected, the microprocessor 10 disables the wireless communication interface 40, restricting the environmental condition sensor device to only wired communications. However, the optical output interface 50 can remain operational.

It is further noted that the microprocessor 10 can be programed so that the wireless communication interface 40 is only activated upon receiving a command from a device connected to the wired communication interface 30.

Figure 3:
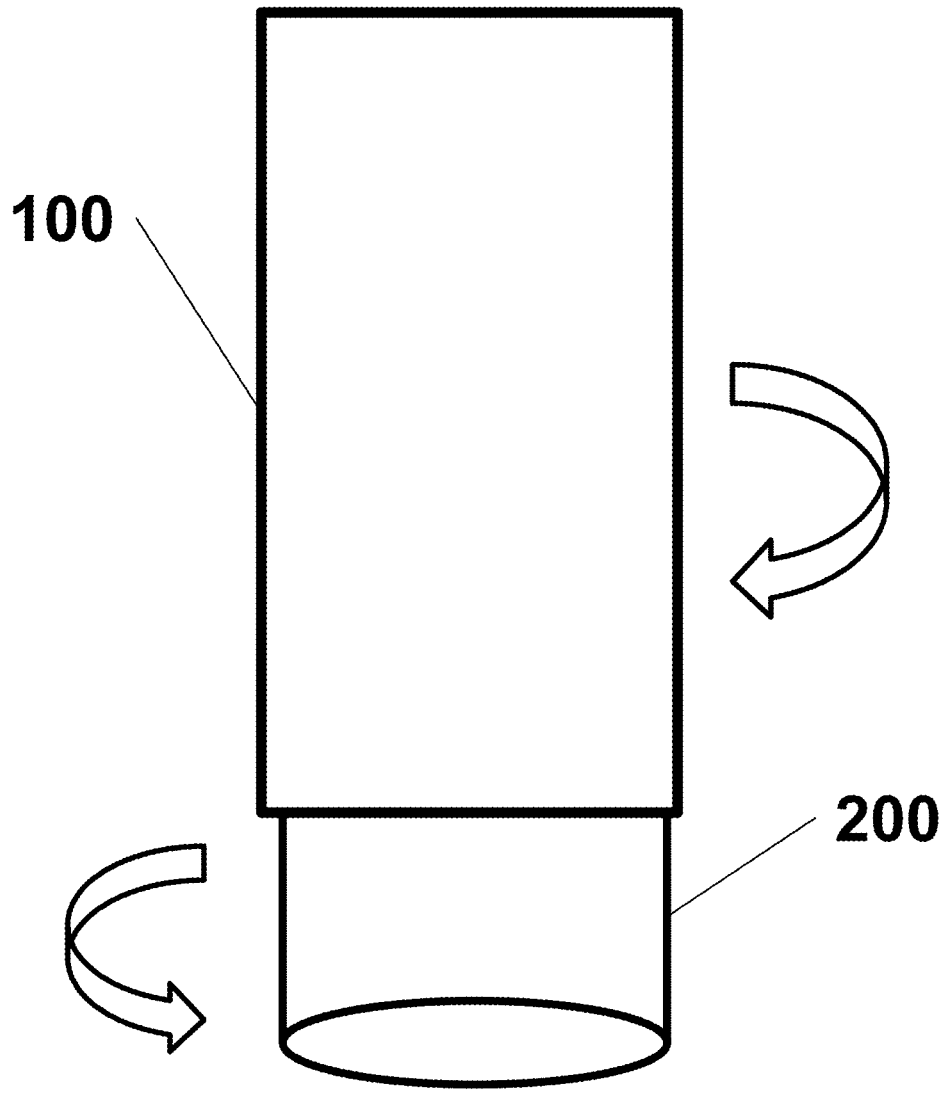
FIG. 3 illustrates an environmental condition sensor device.

FIG. 3 illustrates an environmental condition sensor device. As illustrated in FIG. 3, the environmental condition sensor device includes an environmental condition system interface 200 to connect the environmental condition sensor to a system being monitored. The system interface 200 includes an interface (not shown) that allows the environmental condition (pressure, temperature, humidity, concentration, contaminant, etc.) being monitored to interface with an environmental condition sensor (not shown) within the environmental condition sensor housing 100.

The environmental condition sensor (not shown) and associated circuitry (not shown) are located within an environmental condition sensor housing 100. The environmental condition sensor housing 100 is rotatably (non-rigid) connected to the system interface 200 such that when the system interface 200, as illustrated in FIG. 3, is rotated counterclockwise, the sensor housing 100 can remain stationary or be rotated clockwise. This allows the housing 100 and the environmental condition sensor and associated circuitry to have separate structural integrity, thereby reducing the probability of failure of the environmental condition sensor and associated circuitry caused by damage when connecting the housing 100 to a sensor interface of the system or device to be monitored.

Figure 4:
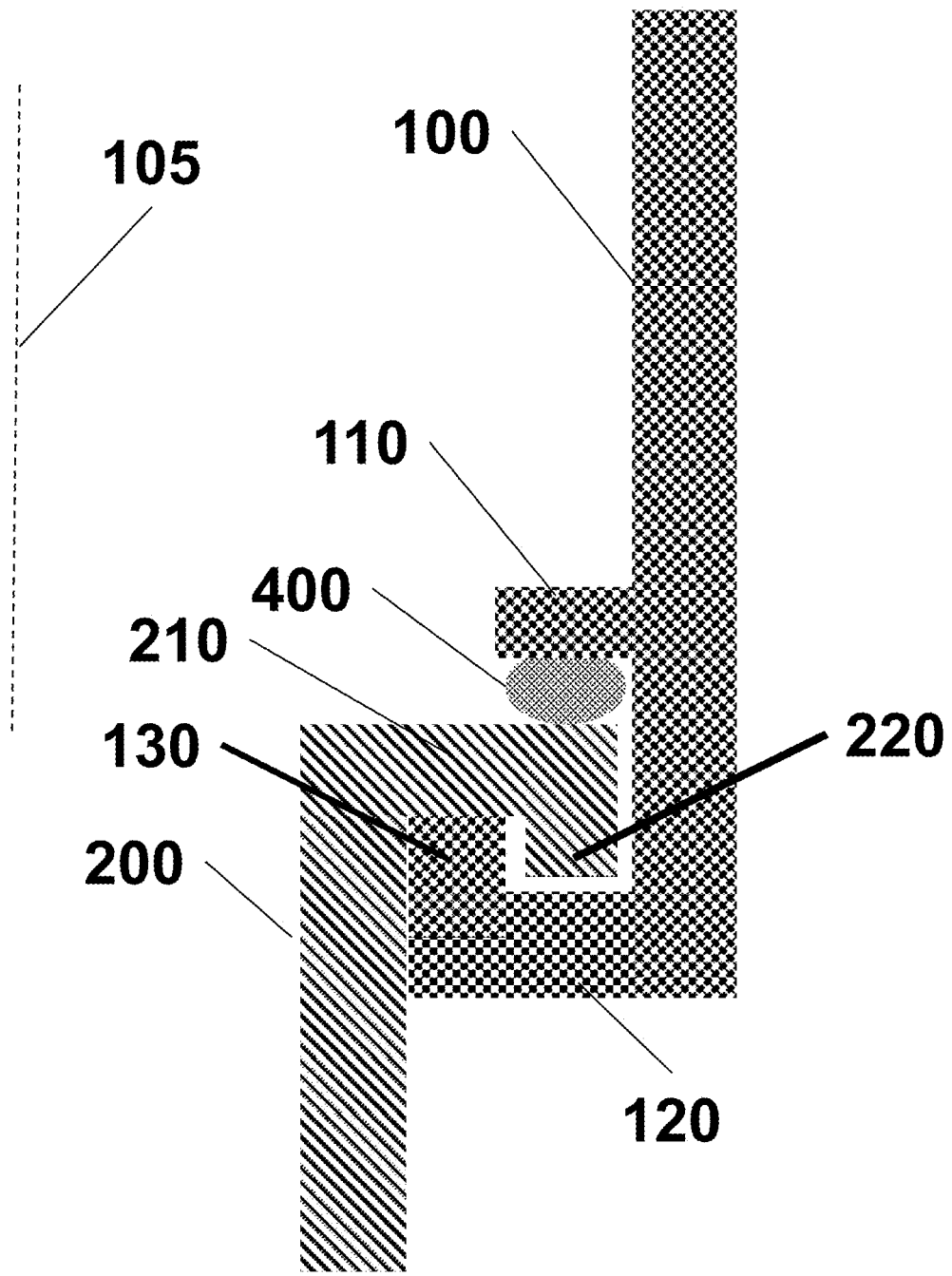
FIG. 4 illustrates a rotatable connection between the system interface and the environmental condition sensor housing of FIG. 3.

The rotatable connection is illustrated in FIG. 4. As illustrated in FIG. 4, the environmental condition sensor housing 100 includes a first stop 110 and a second stop 120 to prevent the system interface 200 from moving in a direction parallel to a central axis 105 of the environmental condition sensor housing 100.

The environmental condition sensor housing 100 includes a third stop 130 to prevent the system interface 200 from moving in a direction perpendicular to the central axis 105 of the environmental condition sensor housing 100. The second stop 120 and the third stop 130 form a channel for protrusion 220, located on extension 210 of the system interface 200.

The protrusion 220 interacts with the third stop 130 to prevent the system interface 200 from moving in a direction perpendicular to the central axis 105 of the environmental condition sensor housing 100. The protrusion 220 is biased into the channel by an O-ring 400, located between the first stop 110 of the environmental condition sensor housing 100 and the extension 210 of the system interface 200.

By having a non-rigid (rotatably) connection that allows the environmental condition sensor housing 100 and the system interface 200 to rotate independently, the connection configuration enables reduced or substantially eliminated damage (environmental condition sensor housing 100 breaking away from the system interface 200) to the environmental condition sensor device when tightening/coupling the system interface 200 to the system being monitored or when decoupling the system interface 200 to the system being monitored.

Moreover, by having the non-rigid (rotatably) connection that allows the environmental condition sensor housing 100 and the system interface 200 to rotate independently, the environmental condition sensor device cannot be coupled or decoupled from the system being monitored by merely rotating the environmental condition sensor housing 100.

Furthermore, by having the non-rigid (rotatably) connection that allows the environmental condition sensor housing 100 and the system interface 200 to rotate independently, the environmental condition sensor device cannot be mistakenly removed from or added to the system being monitored.

Additionally, by having the non-rigid (rotatably) connection that allows the environmental condition sensor housing 100 and the system interface 200 to rotate independently, environmental condition sensor devices being replaced even though the environmental condition sensor and associated circuitry are still capable of being operational can be substantially eliminated.

Figure 5:
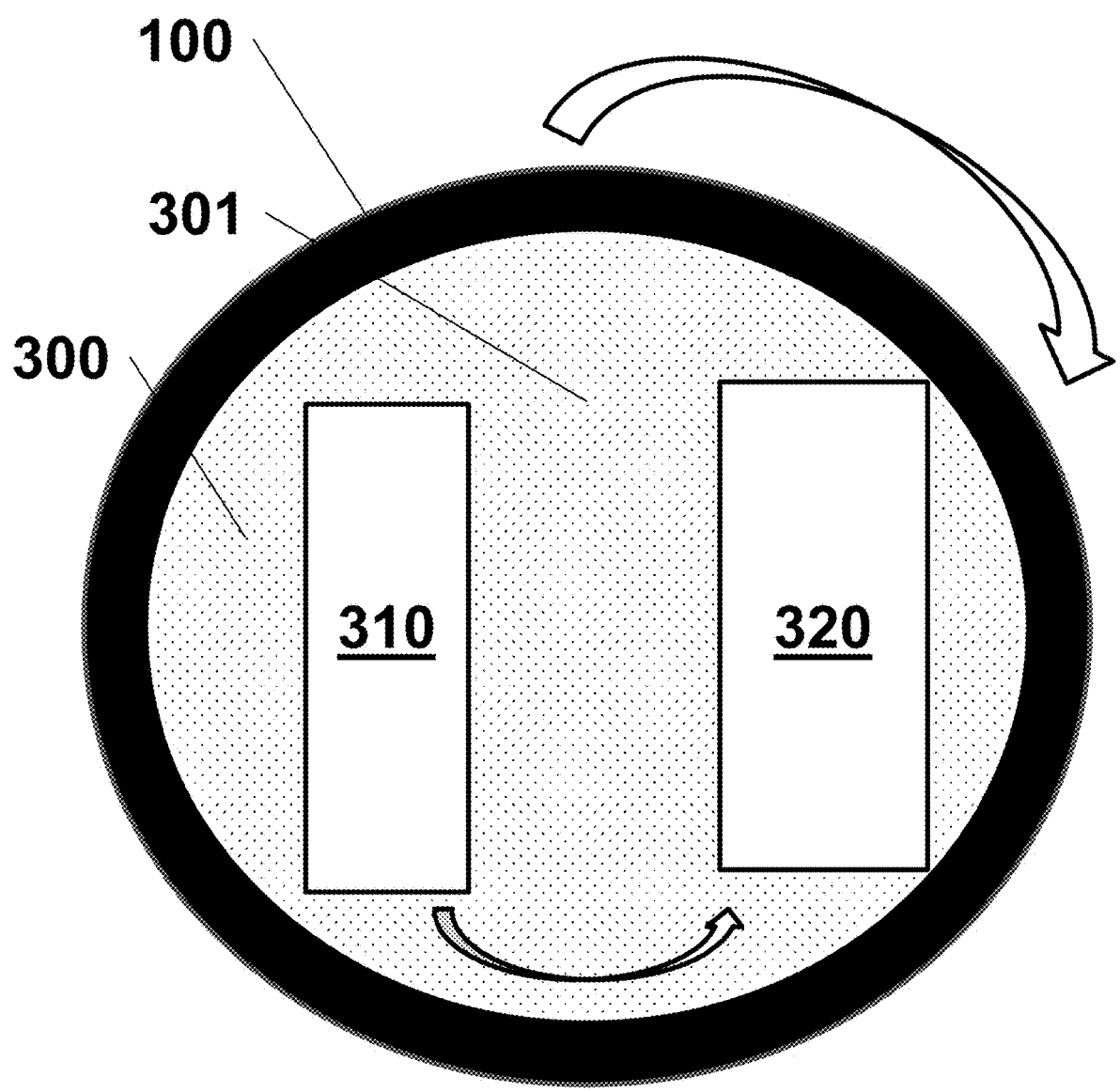
FIG. 5 illustrates a top view of the environmental condition sensor device of FIG. 3.

FIG. 5 illustrates a top view of the environmental condition sensor device of FIG. 3. As illustrated in FIG. 5, the environmental condition sensor device includes an environmental condition sensor housing 100 and an environmental condition sensor housing cap 300. The environmental condition sensor housing 100 is rotatably (non-rigid) connected to the environmental condition sensor housing cap 300 such that when the environmental condition sensor housing 100, as illustrated in FIG. 5, is rotated clockwise, the environmental condition sensor housing cap 300 can remain stationary or be rotated counterclockwise.

The environmental condition sensor housing cap 300 includes a communication port 310 for the wired communication interface 30. The communication port 310 may be a USB port, a RJ-45 port, a RCA port, multiple USB ports, RJ-45 ports, RCA ports, and/or a combination thereof.

The environmental condition sensor housing cap 300 includes a transparent or substantially transparent optical window 320 for the optical output interface 50. The light produced by the optical output interface 50 passes through the transparent or substantially transparent optical window 320 so that the status conditions of the environmental condition sensor can be visually communicated to an operator observing the environmental condition sensor device.

The transparent or substantially transparent optical window 320 may extend vertically above the surface 301 of the environmental condition sensor housing cap 300 so that the optical signal being produced by the optical output interface can be observed from multiple directions.

On the other hand, transparent or substantially transparent optical window 320 may extend vertically above the surface 301 of the environmental condition sensor housing cap 300 so that the optical signal being produced by the optical output interface can be observed from a single direction.

Figure 6:
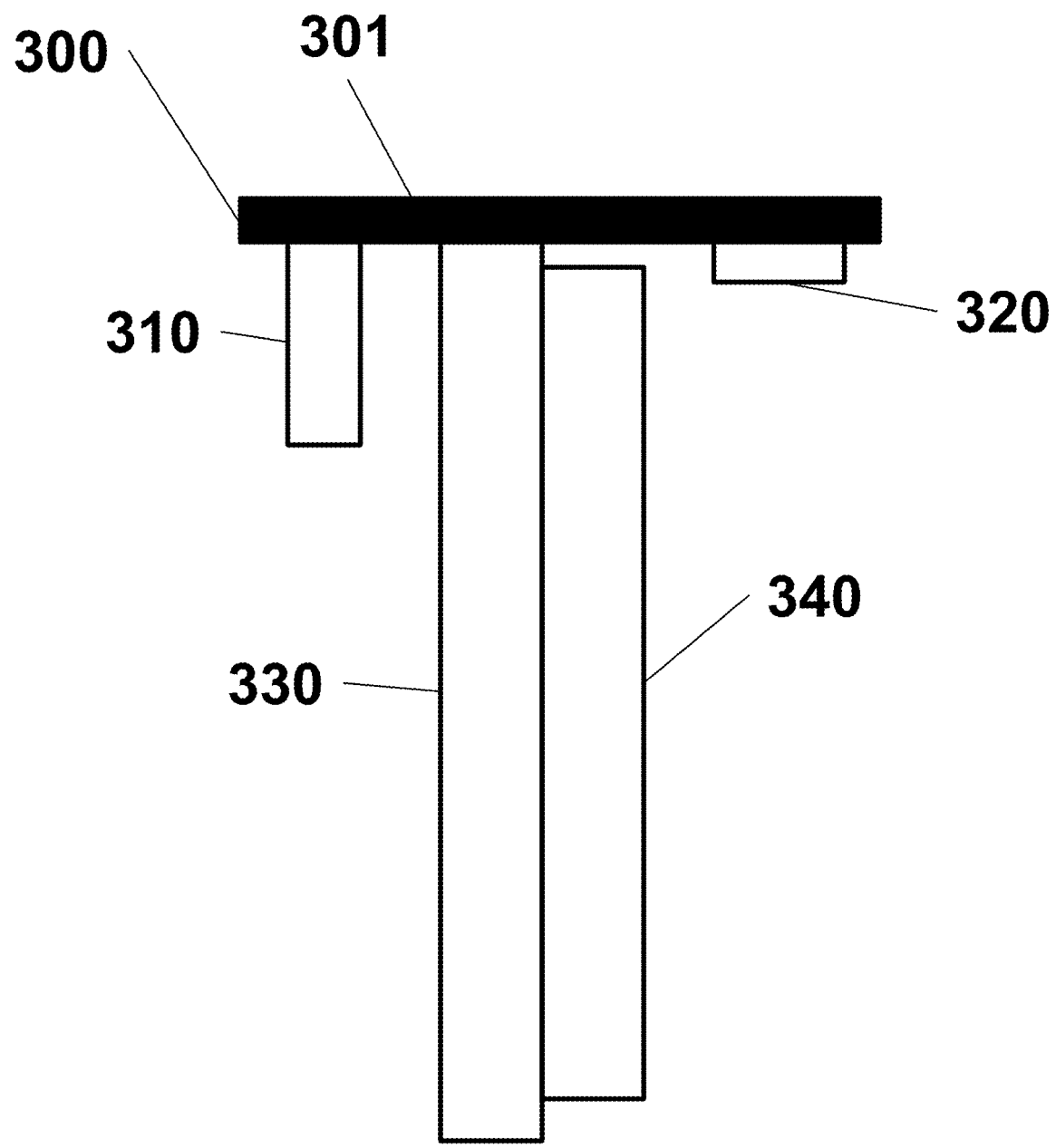
FIG. 6 illustrates a block diagram of an example of the sensor components of the environmental condition sensor device.

FIG. 6 illustrates a block diagram of an example of the sensor components of the environmental condition sensor device. As illustrated in FIG. 6, the environmental condition sensor housing cap 300 may have connected thereto, a transparent or substantially transparent optical window 320 and a communication port 310. The environmental condition sensor housing cap 300 may also be connected to a circuit board 330 for supporting the environmental condition sensor (not shown) and associated circuitry (not shown). A battery 340 may be connected to the circuit board 330.

Figure 7:
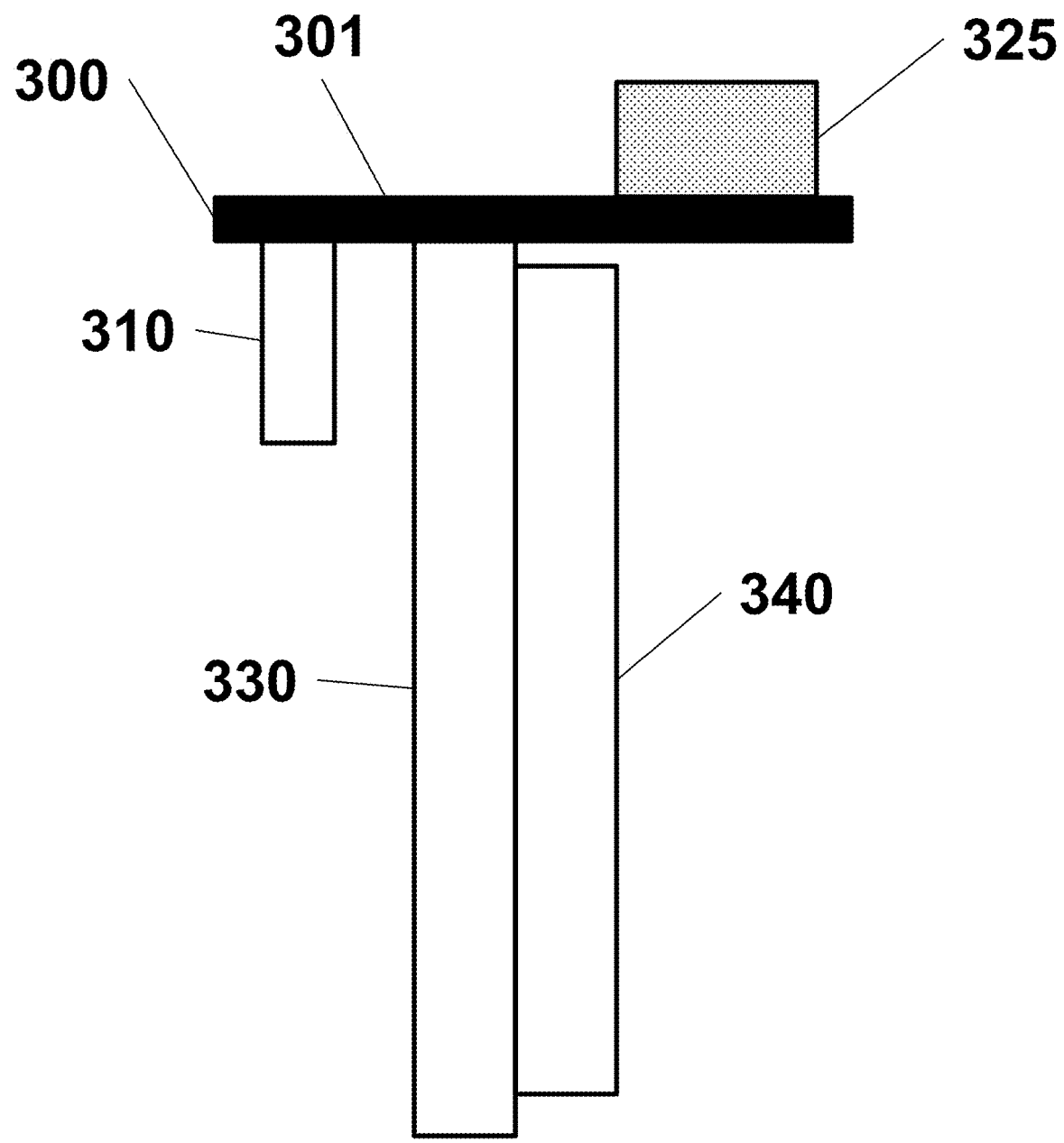
FIG. 7 illustrates a block diagram of another embodiment of the sensor components of the environmental condition sensor device.

FIG. 7 illustrates a block diagram of another example of the sensor components of the environmental condition sensor device. As illustrated in FIG. 7, the environmental condition sensor housing cap 300 may have connected thereto, a transparent or substantially transparent optical block 325 and a communication port 310. The transparent or substantially transparent optical block 325 allows the light produced by the optical output interface 50 to pass through the transparent or substantially transparent optical block 325 as well as deflects (scatters) some of the light laterally so that the status conditions of the environmental condition sensor can be three-dimensionally (multi-directional) visually communicated or directionally visually communicated. This allows the operator to visually determine the status conditions of the environmental condition sensor without requiring a direct line of sight to the surface 301 of the environmental condition sensor housing cap 300.

The environmental condition sensor housing cap 300 is also connected to a circuit board 330 for supporting the environmental condition sensor (not shown) and associated circuitry (not shown), and a battery 340 is connected to the circuit board 330.

Figure 8:
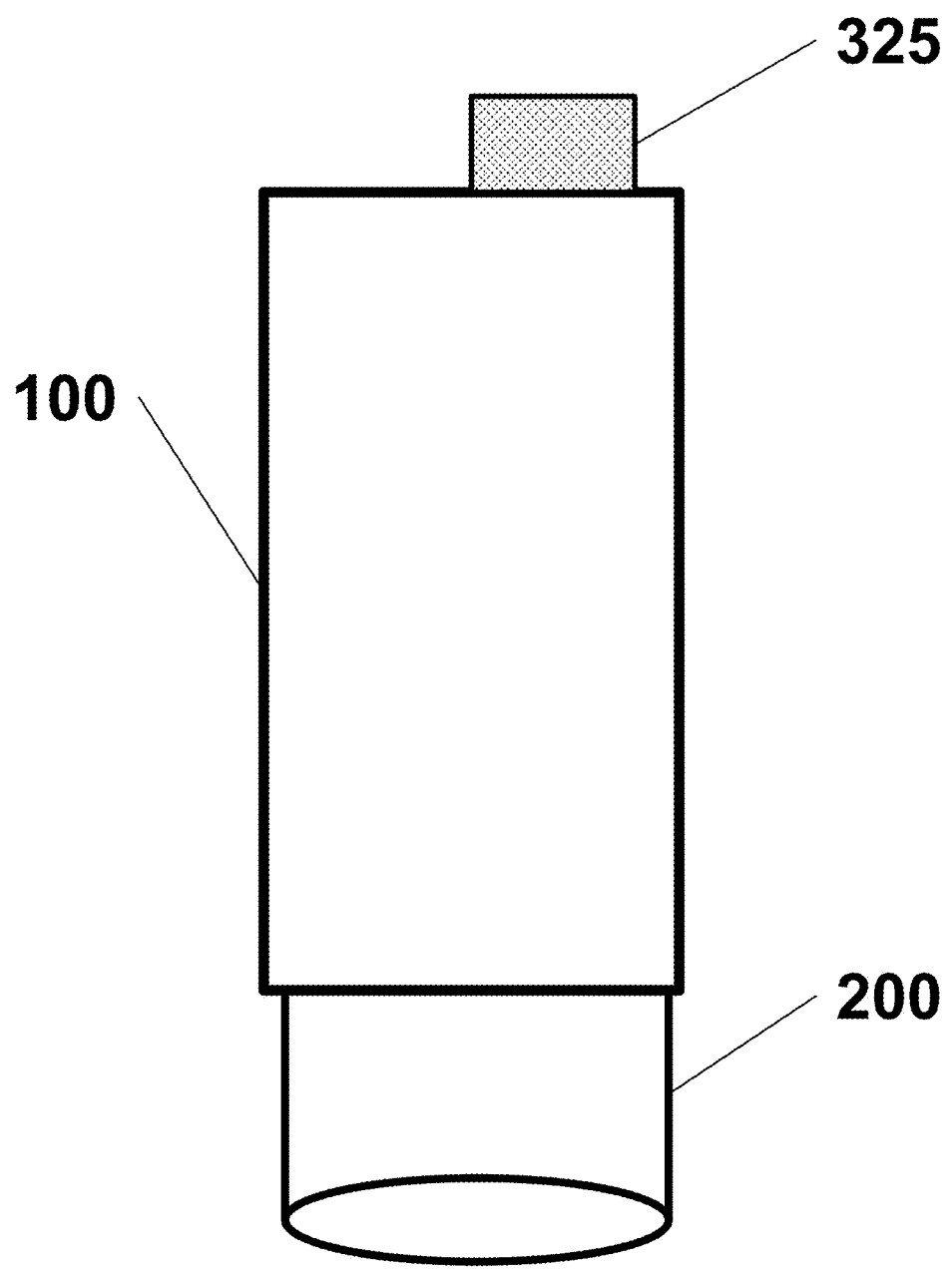
FIG. 8 illustrates another embodiment of an environmental condition sensor device.

FIG. 8 illustrates another embodiment of an environmental condition sensor device. As illustrated in FIG. 8, the environmental condition sensor device includes the environmental condition sensor housing 100, the system interface 200, and a transparent or substantially transparent optical block 325. The transparent or substantially transparent optical block 325 allows the light produced by the optical output interface 50 to pass through the transparent or substantially transparent optical block 325 as well as deflects (scatters) some of the light laterally so that the status conditions of the environmental condition sensor can be three-dimensionally visually communicated. This allows the operator to visually determine the status conditions of the environmental condition sensor without requiring a direct line of sight to the surface of the environmental condition sensor housing cap.

Figure 9:
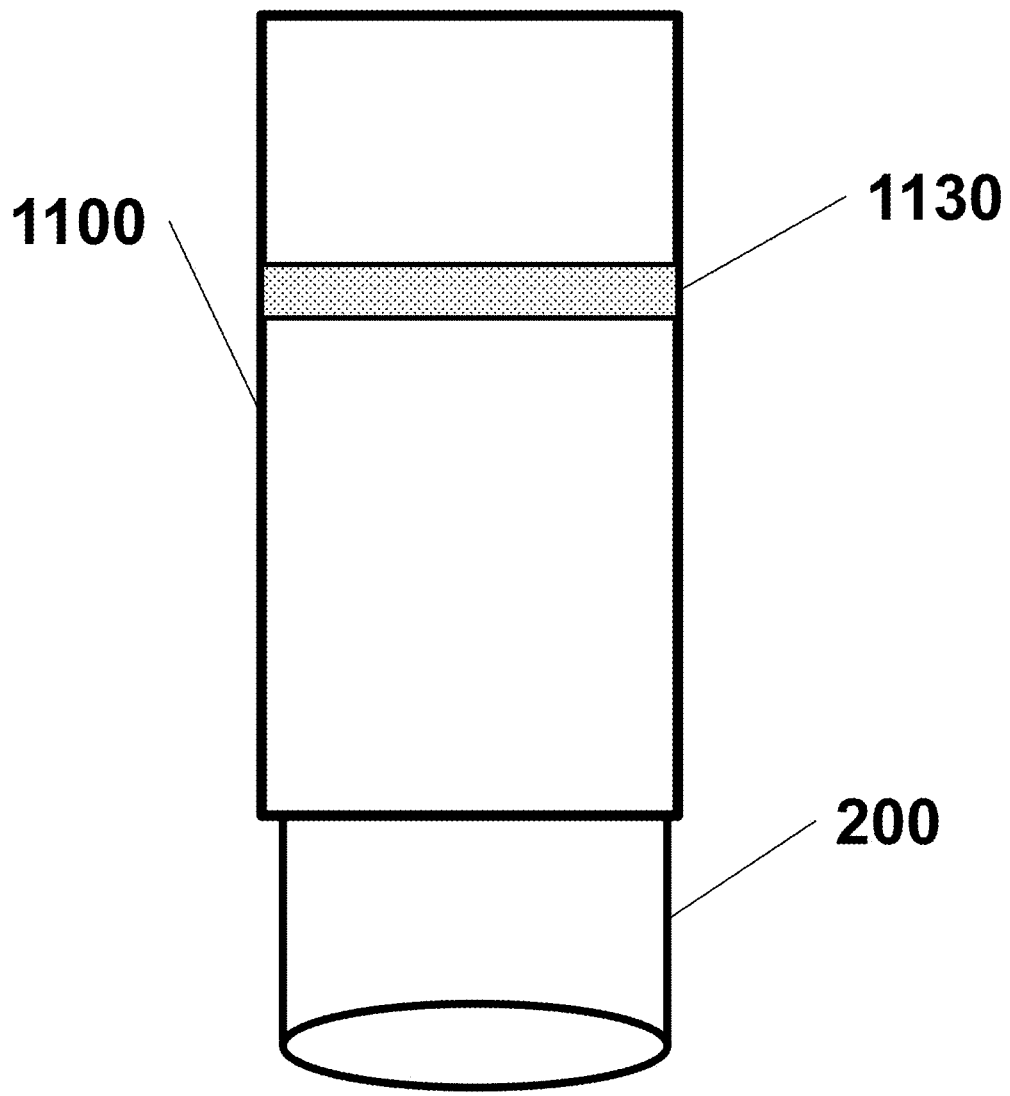
FIG. 9 illustrates another embodiment of an environmental condition sensor device.

FIG. 9 illustrates another embodiment of an environmental condition sensor device. As illustrated in FIG. 9, the environmental condition sensor device includes the environmental condition sensor housing 1100, the system interface 200, and a transparent or substantially transparent optical ring window 1130. The transparent or substantially transparent optical ring window 1130 allows the light produced by the optical output interface 50 to pass through the transparent or substantially transparent optical ring window 1130 so that the status conditions of the environmental condition sensor can be three-dimensionally visually communicated. This allows the operator to visually determine the status conditions of the environmental condition sensor without requiring a direct line of sight to the surface of the environmental condition sensor housing cap.

Figure 10:
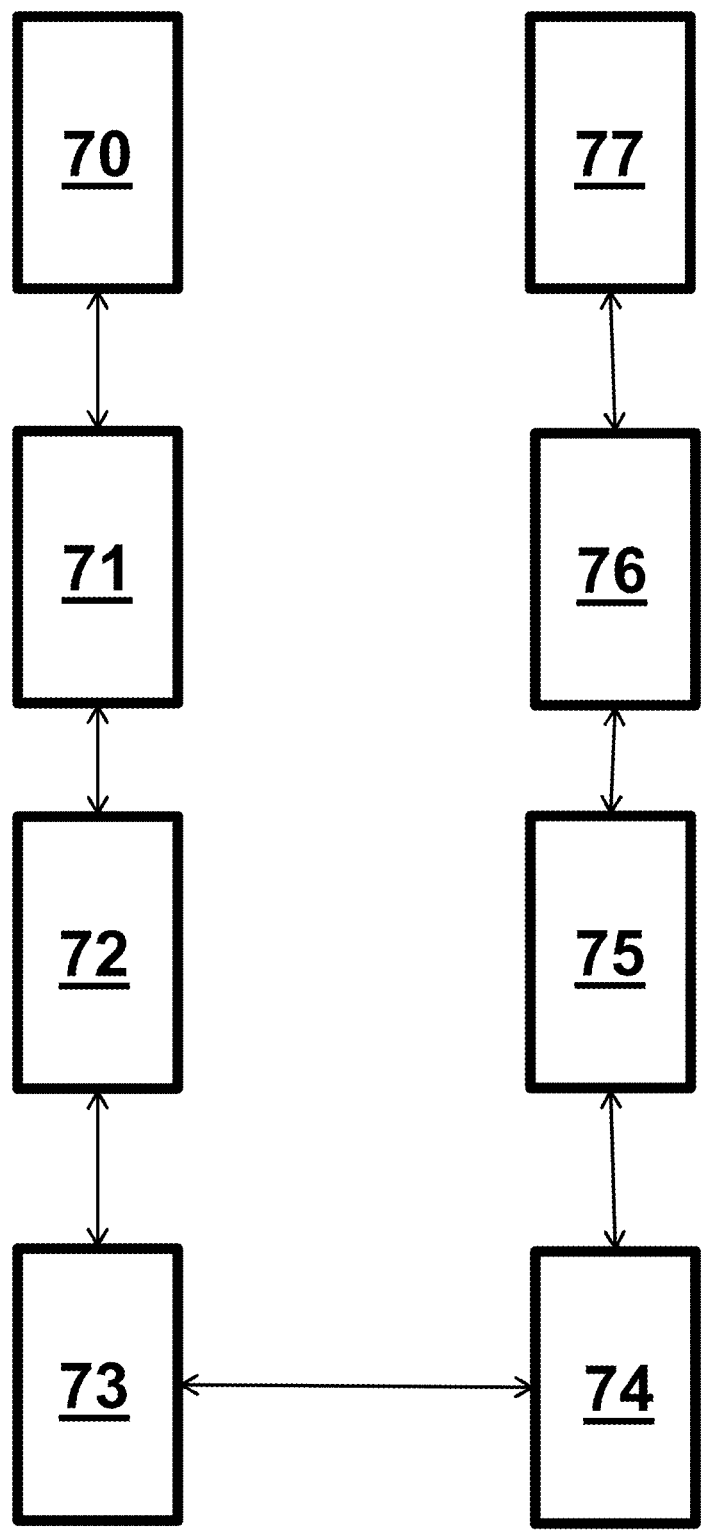
FIG. 10 illustrates communicatively daisy-chained environmental condition sensor devices.

FIG. 10 illustrates a communicatively daisy-chained environmental condition sensor device system. As illustrated in FIG. 10, a plurality of daisy-chained environmental condition sensor devices (70, 71, 72, 73, 74, 75, 76, and 77) communicate with each other through a daisy-chain communication network. The daisy-chain communication network may be wired or wireless.

In this example, environmental condition sensor device 70 acts as a master device and can interrogate each of the other environmental condition sensor devices. Each environmental condition sensor device is individually addressable such that the master environmental condition sensor device 70 can send an interrogation down the daisy-chain communication network addressed to a specific environmental condition sensor device. This allows data to be passed from one networked device/sensor to another networked device/sensor.

The interrogation is passed along by each environmental condition sensor device until the interrogation is received by the addressed environmental condition sensor device. The addressed environmental condition sensor device then replies to the interrogation and sends the requested data and/or information back up the daisy-chain communication network to the master environmental condition sensor device 70.

An environmental condition sensor device can become a master environmental condition sensor device when a calibration device is plugged into the environmental condition sensor device or a smartphone or other electronic device is paired with the environmental condition sensor device.

A wireless daisy-chain communication network is used in situations where the distances between certain environmental condition sensor devices may be outside the range of the wireless communication protocol. A wired daisy-chain communication network is used in situations where the environment is not conducive to a single long cable running between a central monitoring station and a distance environmental condition sensor device.

Figure 11:
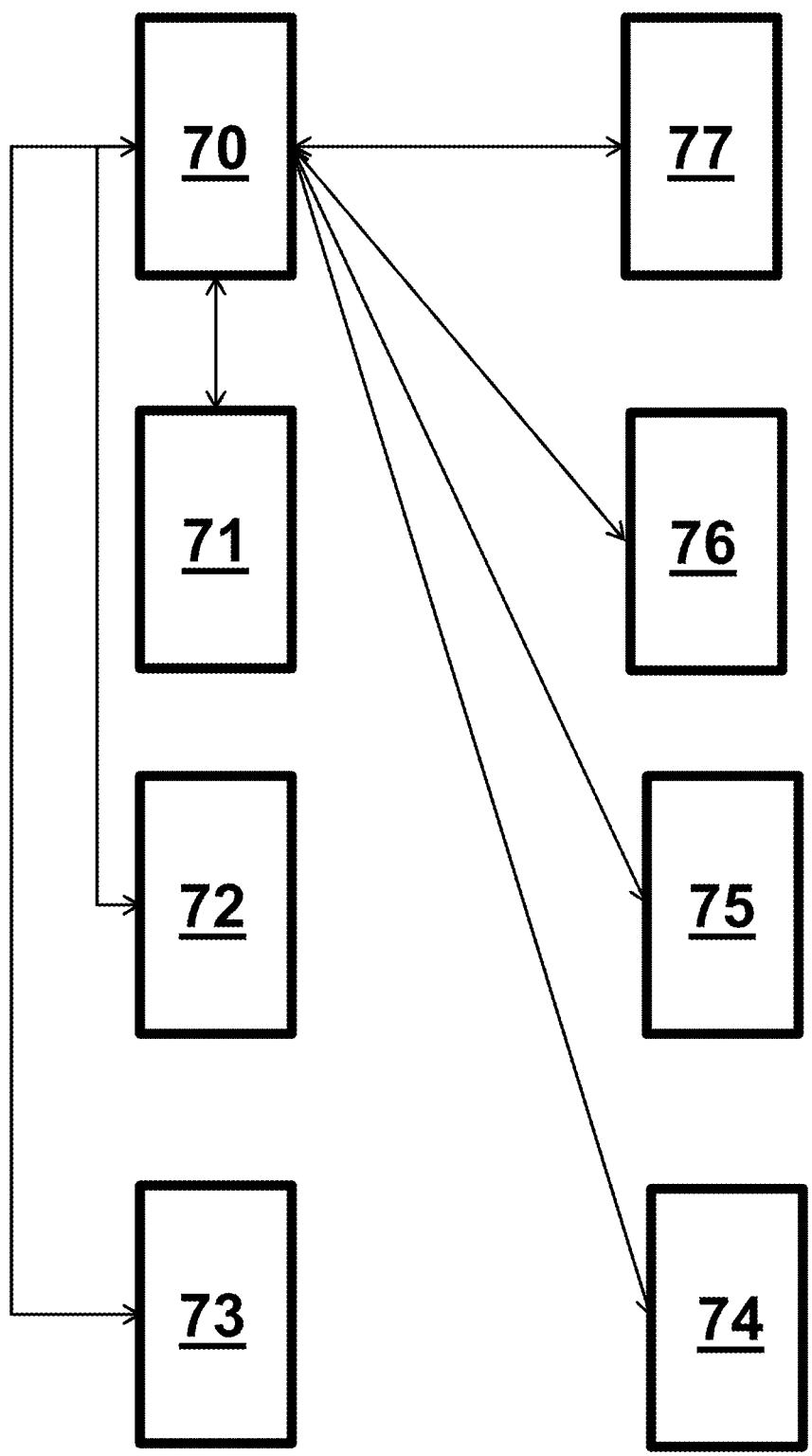
FIG. 11 illustrates another embodiment of communicatively connected environmental condition sensor devices.

FIG. 11 illustrates another embodiment of communicatively connected environmental condition sensor devices. As illustrated in FIG. 11, a plurality of environmental condition sensor devices (71, 72, 73, 74, 75, 76, and 77) communicate with a master environmental condition sensor device 70. The master/slave communication network may be wired or wireless.

In this example, environmental condition sensor device 70 acts as a master device and can interrogate each of the other environmental condition sensor devices. Each environmental condition sensor device is individually addressable such that the master environmental condition sensor device 70 can send an interrogation, in a wireless communication environment, addressed to a specific environmental condition sensor device. In a wired environment, the master environmental condition sensor device 70 sends the interrogation along the correct communication line. Thus, the environmental condition sensor device 70, acting as a master device, gatherers (collects) individualized data from the addressed device/sensor.

The addressed environmental condition sensor device then replies to the interrogation and sends the requested data and/or information back to the master environmental condition sensor device 70.

An environmental condition sensor device can become a master environmental condition sensor device when a calibration device is plugged into the environmental condition sensor device or a smartphone or other electronic device is paired with the environmental condition sensor device.

Figure 12:
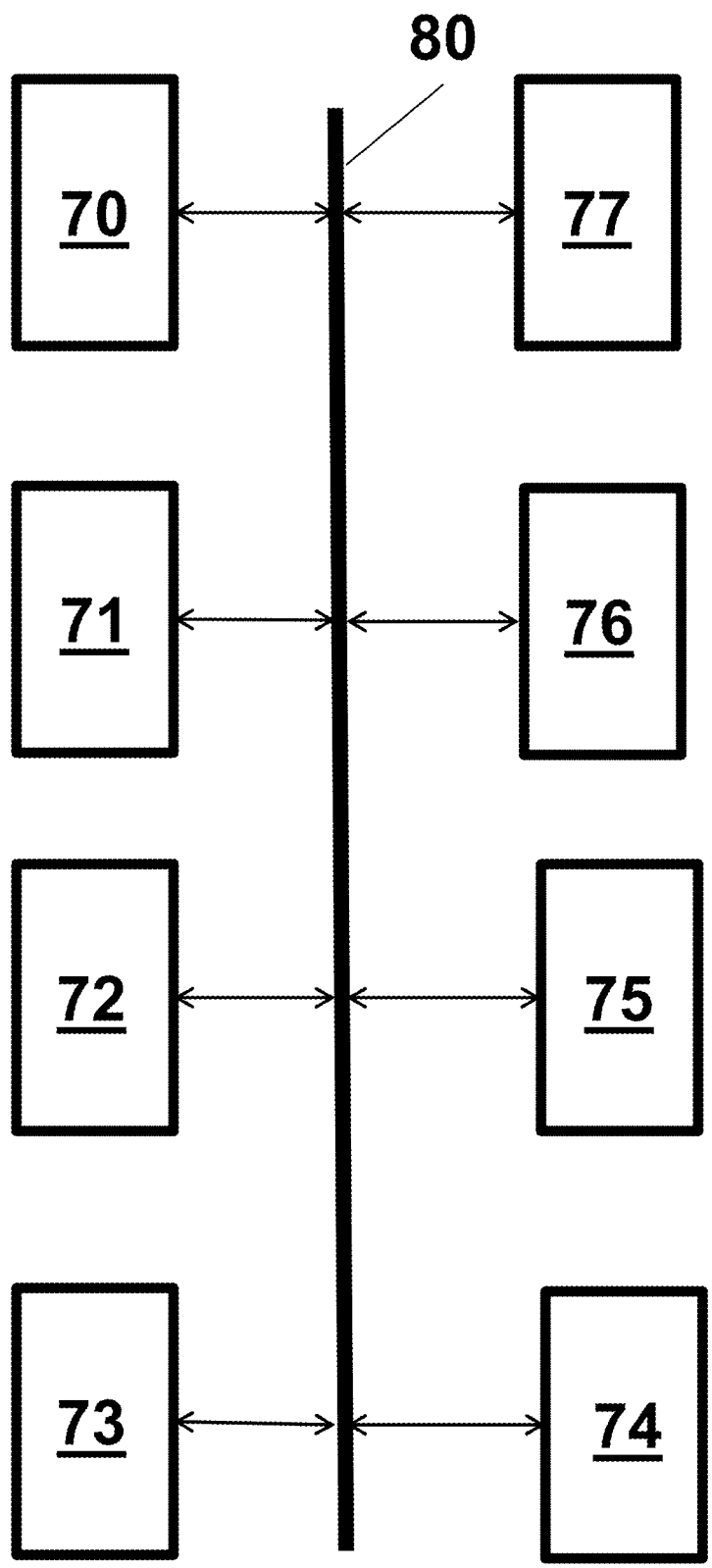
FIG. 12 illustrates another embodiment of communicatively connected environmental condition sensor devices.

FIG. 12 illustrates another embodiment of communicatively connected environmental condition sensor devices. As illustrated in FIG. 12, a plurality of environmental condition sensor devices (70, 71, 72, 73, 74, 75, 76, and 77) communicate along data bus 80.

Each environmental condition sensor device is individually addressable such that an interrogation is only acted upon by the addressed environmental condition sensor device. Thus, each environmental condition sensor device transmits data that may be exclusive to that environmental condition sensor device.

As with the other communication networks of FIGS. 10 and 11, an environmental condition sensor device, in the communication network of FIG. 12, can become a master environmental condition sensor device or a slave environmental condition sensor device when a calibration device is plugged into the environmental condition sensor device or a smartphone or other electronic device is paired with the environmental condition sensor device.

Figure 13:
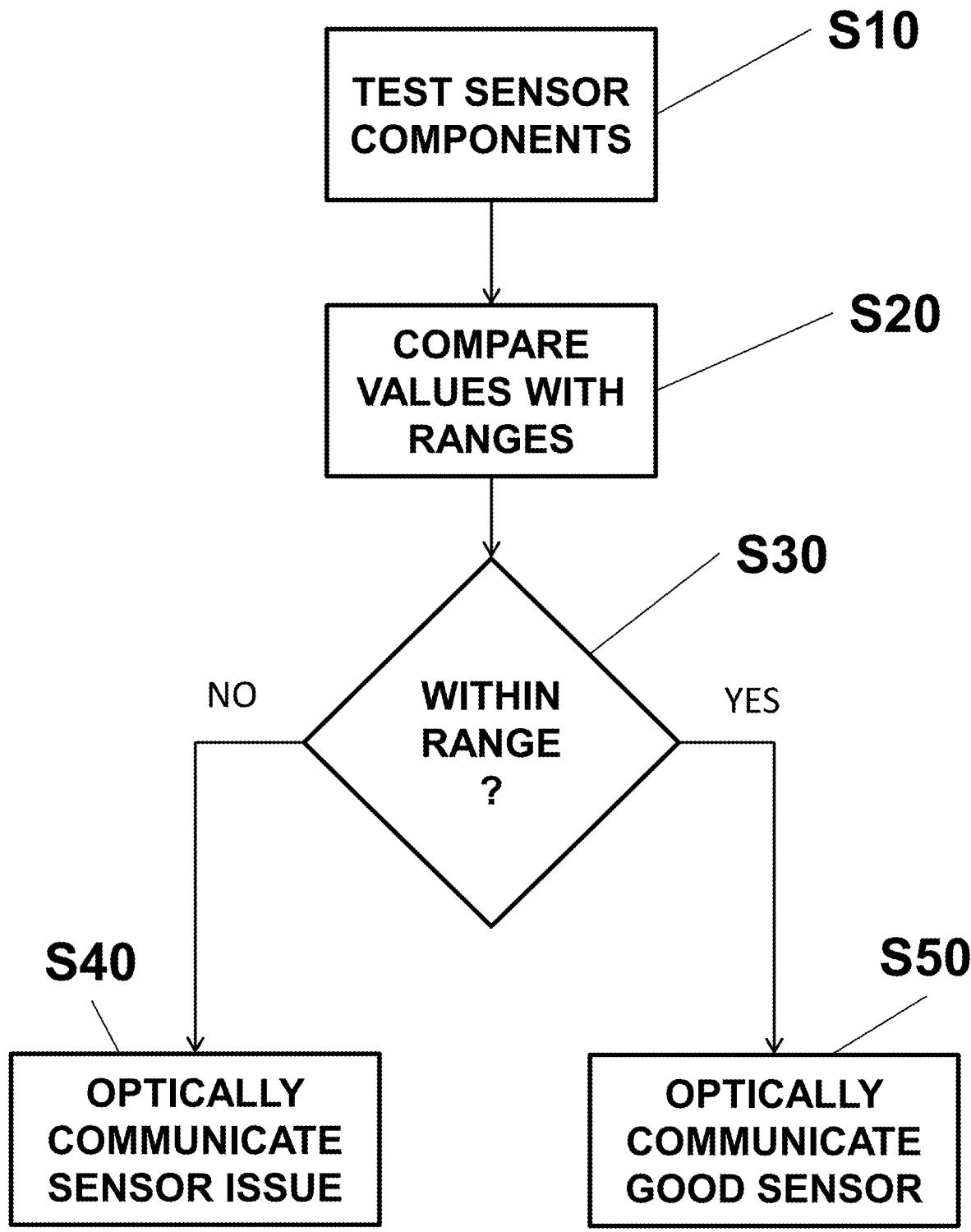
FIG. 13 illustrates a flowchart of a diagnostics/communication process for testing components of the environmental condition sensor device.

FIG. 13 illustrates a flowchart of a diagnostics/communication process for testing components of the environmental condition sensor device. As illustrated in FIG. 13, a microprocessor initiates a testing of a sensor component, at step S10. The microprocessor receives the data from the test and compares the received value(s) with acceptable range(s), at step S20. At step S30, it is determined if the value(s) is within the acceptable range(s). If the value(s) is within the acceptable range(s), step S50 causes the optical output interface to optically communicate that the environmental condition sensor device is operational. If the value(s) is not within the acceptable range(s), step S40 causes the optical output interface to optically communicate that the environmental condition sensor device has issues and may not be operational.

Although the above flowchart addresses an in-situ testing/communication process, the results of the testing can also be wirelessly or hard wired communicated to a device, such as a smartphone, a personal digital assistant device, a portable calibration and verification device, a central monitoring system, or other smart/wireless devices.

As described above, the environmental condition sensor device performs internal diagnostics to assist in determining the health and/or usability of the environmental condition sensor device, such as if the components of the sensor are out of acceptable operating ranges. The internal diagnostics enables an early warning communication of a possible failure or warning about usability.

It is noted that the environmental condition sensor device performs internal diagnostics to monitor multiple environmental conditions to assist in determining the health and/or usability of the environmental condition sensor device.

The internal diagnostics may include resistance measurements, impedance measurements, bridge configuration measurements, drift, temperature, temperature drift, pressure, vibrations, hysteresis, etc. to assist in determining failure or operational status.

The environmental condition sensor device can log time, pressure, system noise, etc. for later analysis, whether it is data priori to a failure, data after a failure, or general system monitoring. The logged data can be used to predict a failure of the environmental condition sensor device, long term status of the environmental condition sensor device, and/or long-term serviceability of the environmental condition sensor device.

The optical output enables a simple communication protocol that is visible and discernible from a distance. In other words, the status of the environmental condition sensor device can be determined even if the environmental condition sensor device is not readily accessible.

It is noted that the status of the environmental condition sensor device can also be communicated wirelessly or hard wired communicated to a device, such as a smartphone, a personal digital assistant device, a portable calibration and verification device, a central monitoring system, or other smart/wireless devices.

The communication protocols between the environmental condition sensor devices allow an operator to calibrate an environmental condition sensor device remotely (relatively) from another environmental condition sensor device. The environmental condition sensor device to environmental condition sensor device communication ability allows the measuring of low differential pressures while displaying and being connected to the higher static pressure in differential pressure applications and smaller linear errors are taken advantage of.

Figure 14:
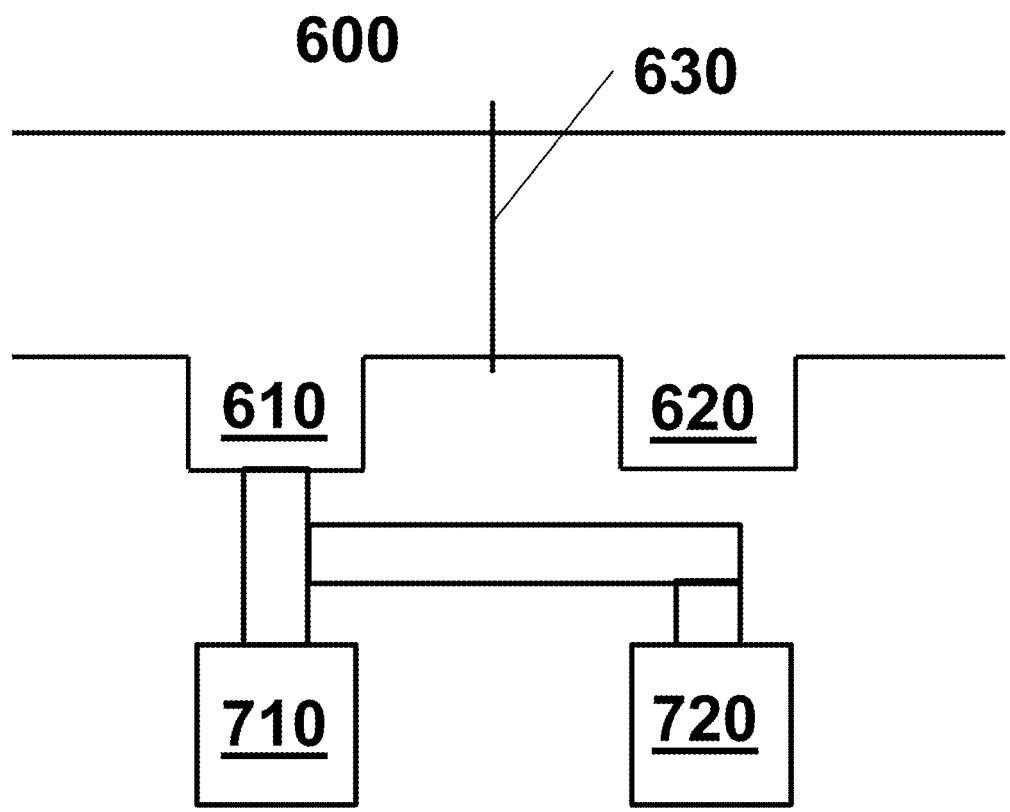
FIGS. 14 and 15 illustrate block diagrams for calibrating pressure sensors in a transfer station
Figure 15:
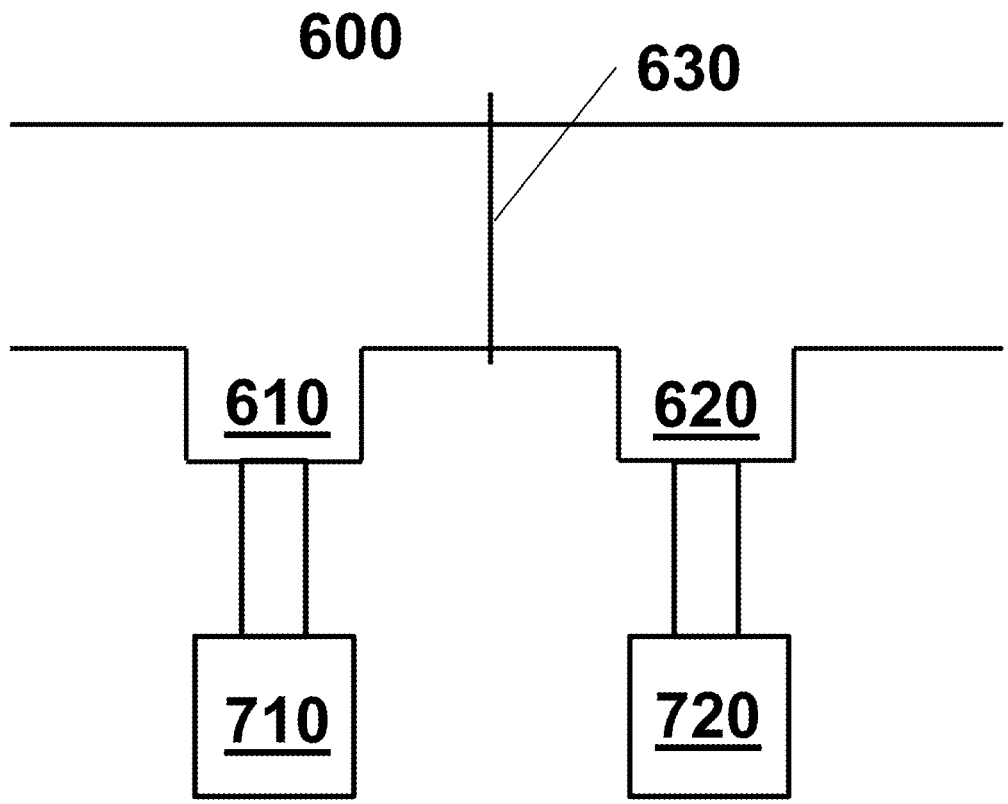

Also, since the environmental condition sensor device has wireless communication capabilities, the sensor's gauge or optical output interface can be located remotely from the actual environmental condition sensor, thereby allowing the operator to ascertain the desired information even when the environmental condition sensor device is not readily accessible and/or the safety of the operator could be impaired FIGS. 14 and 15 illustrate block diagrams for calibrating pressure sensors (710 and 720) in a transfer station 600. To monitor the material passing through the transfer station, the pressure sensors (710 and 720) on either side of the transfer point (orifice plate 630) must be calibrated relative to each other.

As illustrated in FIG. 14, each pressure sensor (710 and 720) is connected to a first portal 610 on a first side of the transfer station 600. Both sensors are calibrated to read the same pressure at the first port 610. Once calibrated, as illustrated in FIG. 15, the pressure sensor 720 is connected to a second portal 620 on a second side of the transfer station 600. Since the pressure sensors (710 and 720) were calibrated at the first portal 620, any change in pressure in the pressure sensor 720 will substantially indicate a transfer through the transfer station 600.

Figure 16:
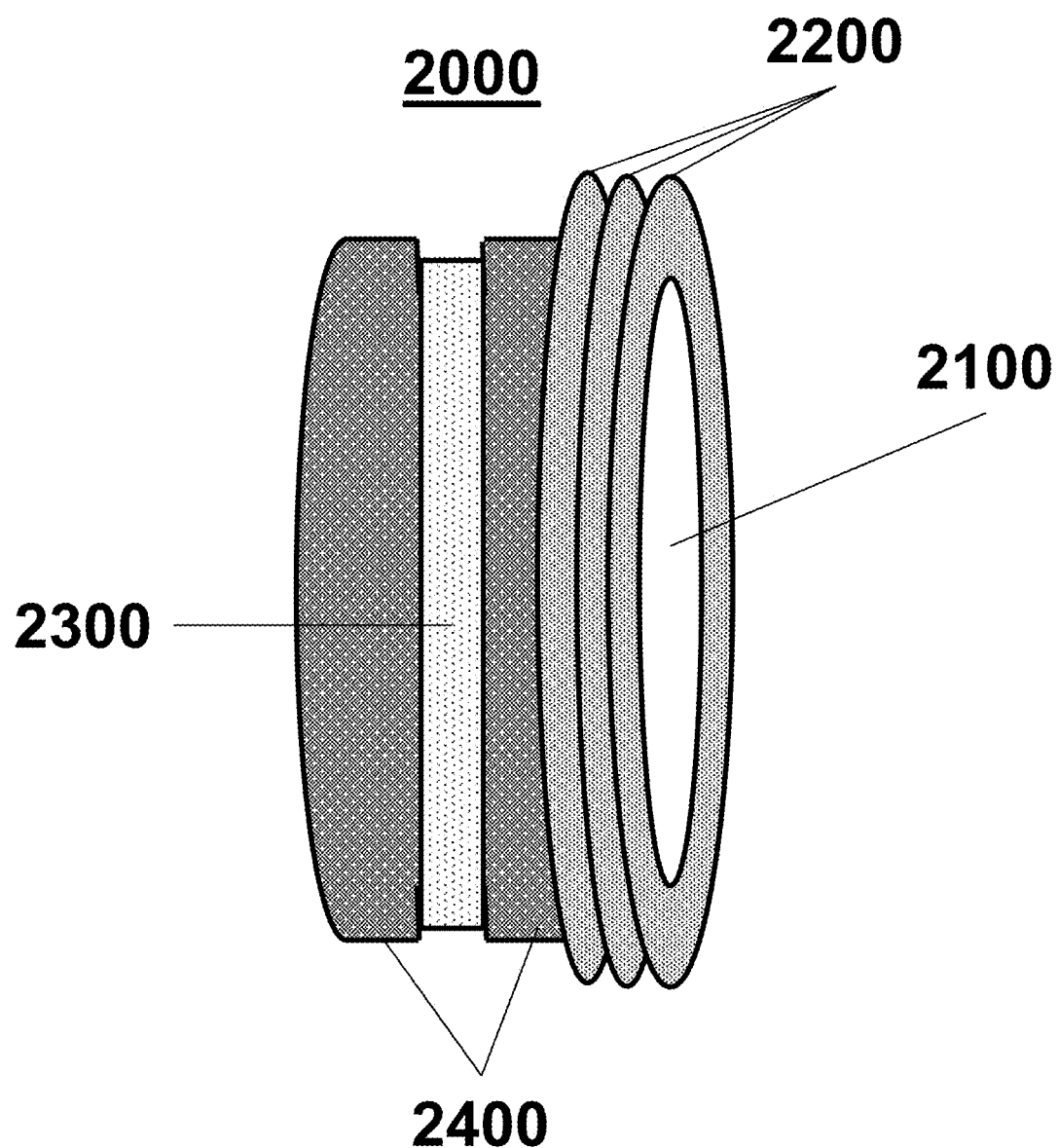
FIG. 16 illustrates a connection member of a second embodiment of an environmental condition sensor device.

FIG. 16 illustrates a connection member of a second embodiment of an environmental condition sensor device. As illustrated in FIG. 16, a connection member 2000 includes a fitting or threaded interface 2200 to attach to the system or device being monitored. The connection member 2000 also includes an opening 2100 to enable connection of a pressed fit assembled transducer, such as a pressure transducer.

The connection member base 2400 has a channel or groove 2300 for receiving a C-ring (not shown). The combination of the channel or groove 2300 and the C-ring (not shown) enables the connection member 2000 to be freely rotatably connected to a housing (not shown).

More specifically, the combination of the channel or groove 2300 and the C-ring (not shown) enables a housing (not shown) to be easily rotated freely around electronic assemblies located internal of the housing, thereby preventing damage to the internal components and assemblies if rotational force is applied to the housing.

Figure 17:
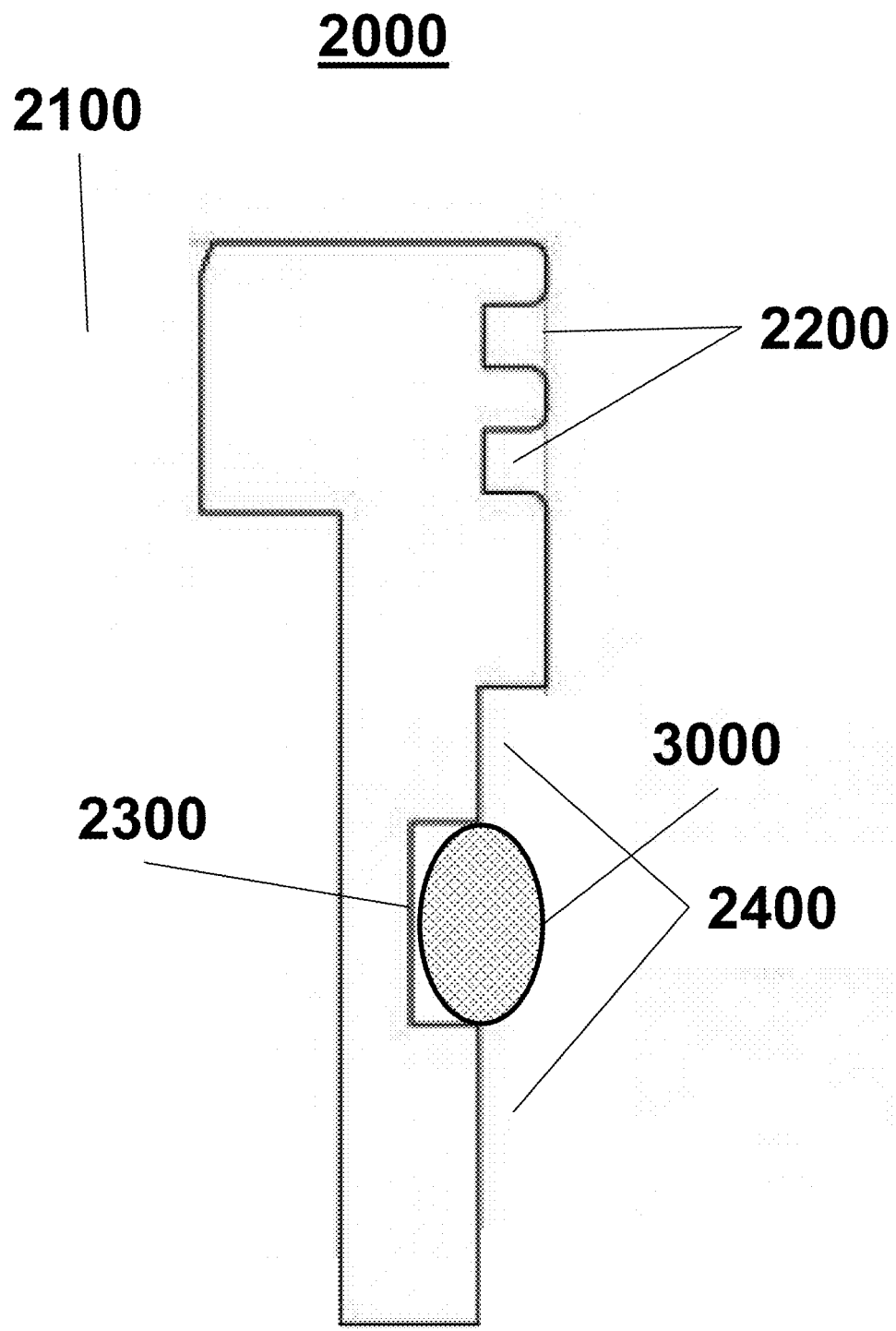
FIG. 17 illustrates a cut-away view of the connection member of FIG. 16.

FIG. 17 illustrates a cut-away view of the connection member of FIG. 16. As illustrated in FIG. 17, a connection member 2000 includes a fitting or threaded interface 2200 to attach to the system or device being monitored. The connection member 2000 also includes an opening 2100 to enable the connection of a pressed fit assembled transducer, such as a pressure transducer.

The connection member base 2400 has a channel or groove 2300 for receiving a C-ring 3000. The combination of the channel or groove 2300 and the C-ring 3000 enables the connection member 2000 to be freely rotatably connected to a housing (not shown).

Figure 18:
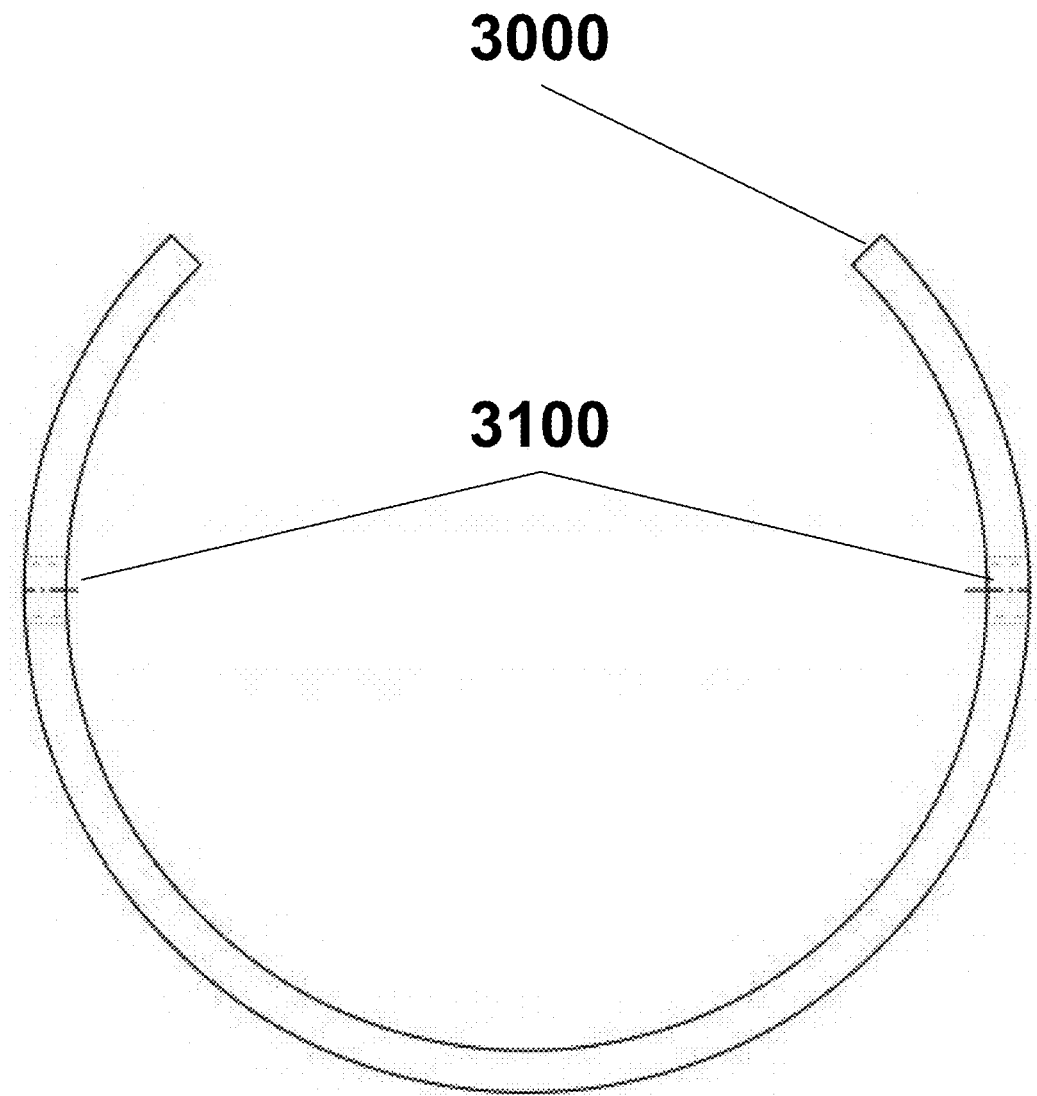
FIG. 18 illustrates a C-ring for the connection member of FIG. 16.

FIG. 18 illustrates a C-ring for the connection member of FIG. 16. As illustrated in FIG. 18, a C-ring 3000 includes threaded holes 3100 for receiving screws (not shown).

Although FIG. 18 shows two threaded holes 3100, a plurality of threaded holes 3100 may be provided.

The C-ring 3000 is fitted in the channel or groove 2300 of the connection member 2000, as illustrated in FIGS. 16 and 17.

Figure 19:
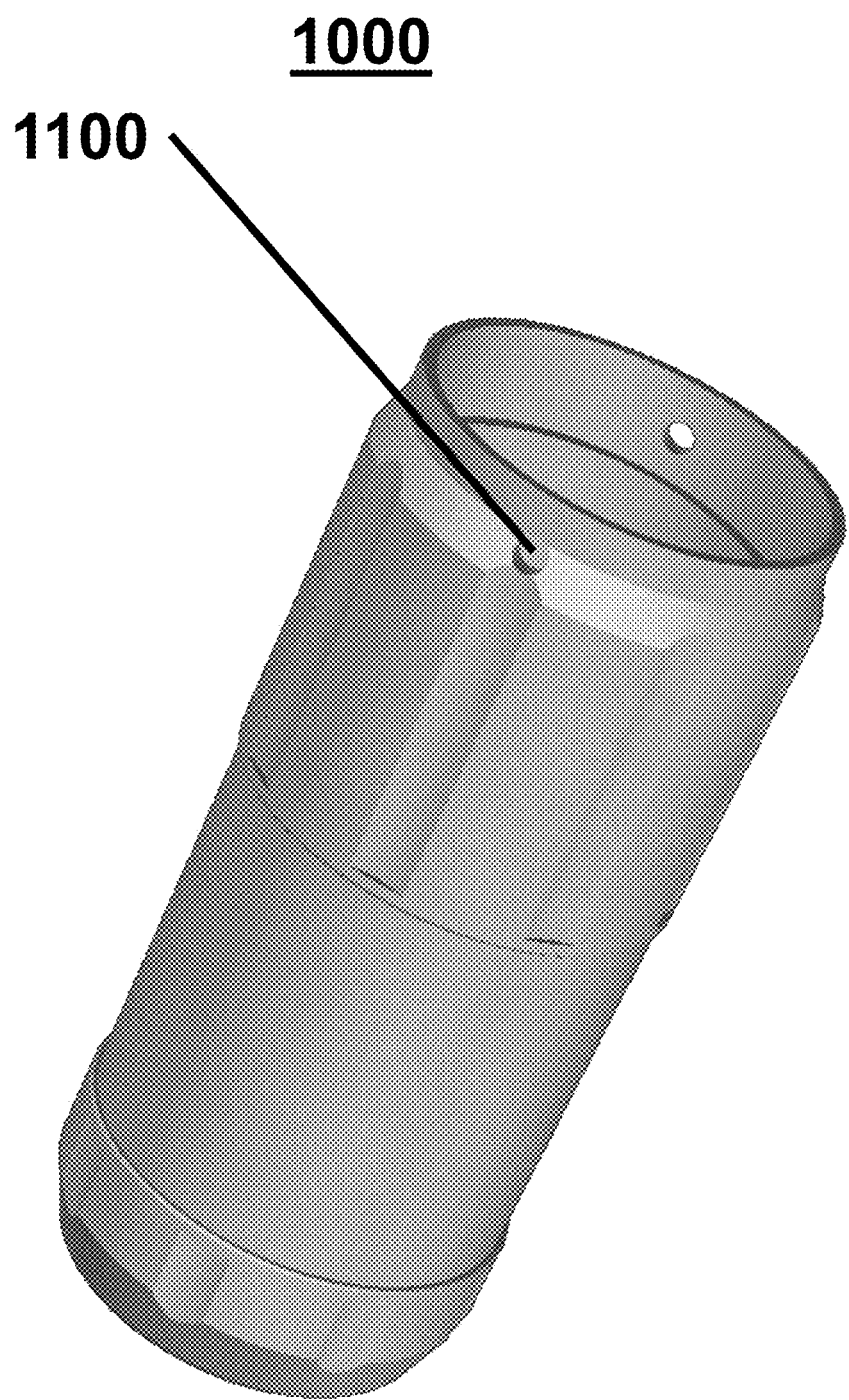
FIG. 19 illustrates a housing member of the second embodiment of an environmental condition sensor device.

FIG. 19 illustrates a housing member of the second embodiment of an environmental condition sensor device. As illustrated in FIG. 19, a housing 1000 includes non-threaded through-holes 1100 for receiving screws (not shown). The non-threaded through-holes 1100 are aligned with the threaded holes 3100 of the C-ring 3000 of FIG. 18.

When the screws pass through the non-threaded through-holes holes 1100 and engage the threaded holes 3100 of the C-ring 3000, when fitted in the channel or groove 2300 of the connection member 2000, a freely rotatable connection between the housing 1000 and the connection member 2000 is realized.

Figure 20:
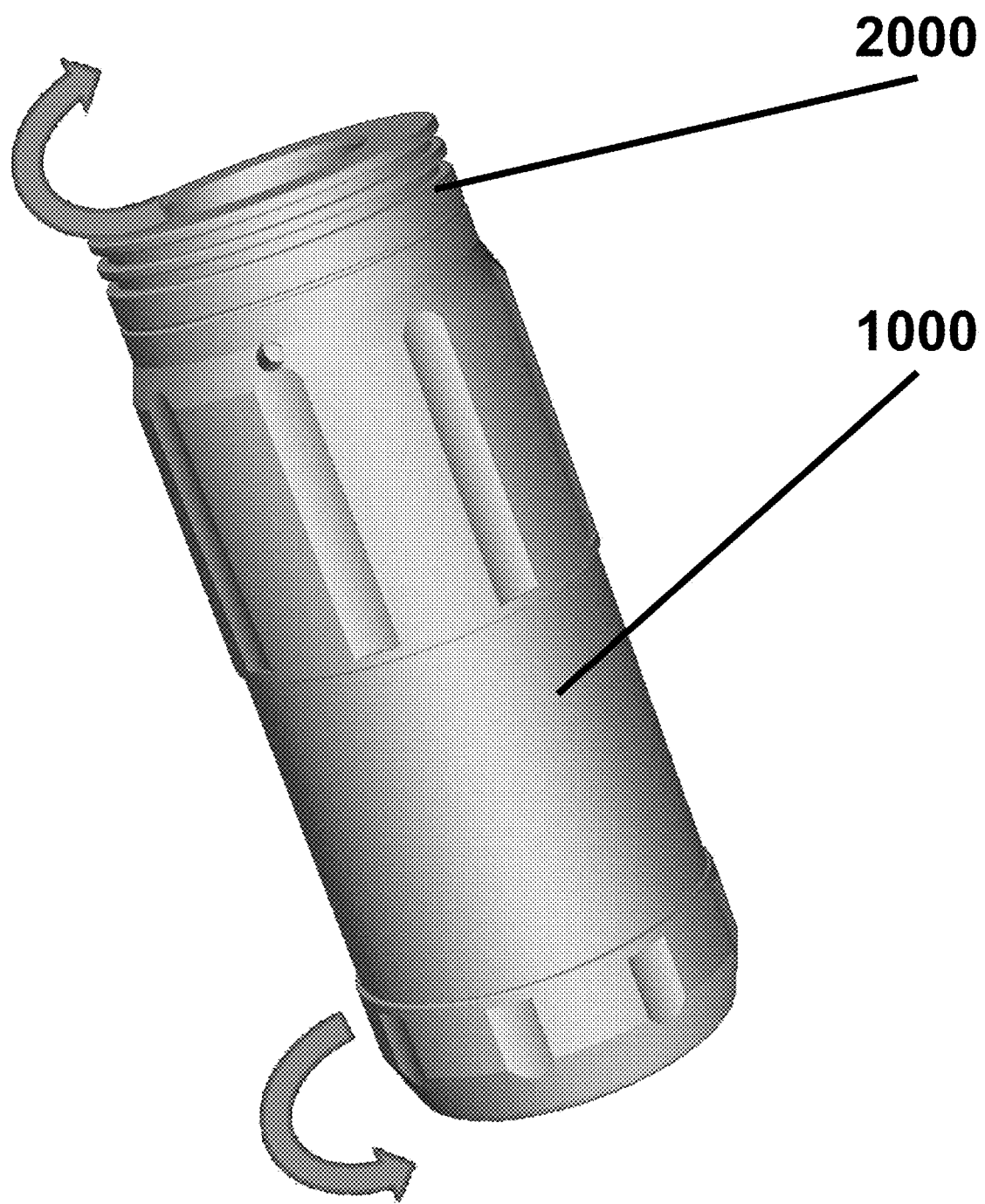
FIG. 20 illustrates the second embodiment of an environmental condition sensor device.

FIG. 20 illustrates the second embodiment of an environmental condition sensor device. As illustrated in FIG. 20, a freely rotatable connection between the housing 1000 and the connection member 2000 has been realized such that the housing 1000 can rotate freely of the connection member 2000 or remain stationary when the connection member 2000 is rotated, thereby preventing damage to components and assemblies within the housing 1000 if rotational force is applied to the housing 1000.

Figure 21:
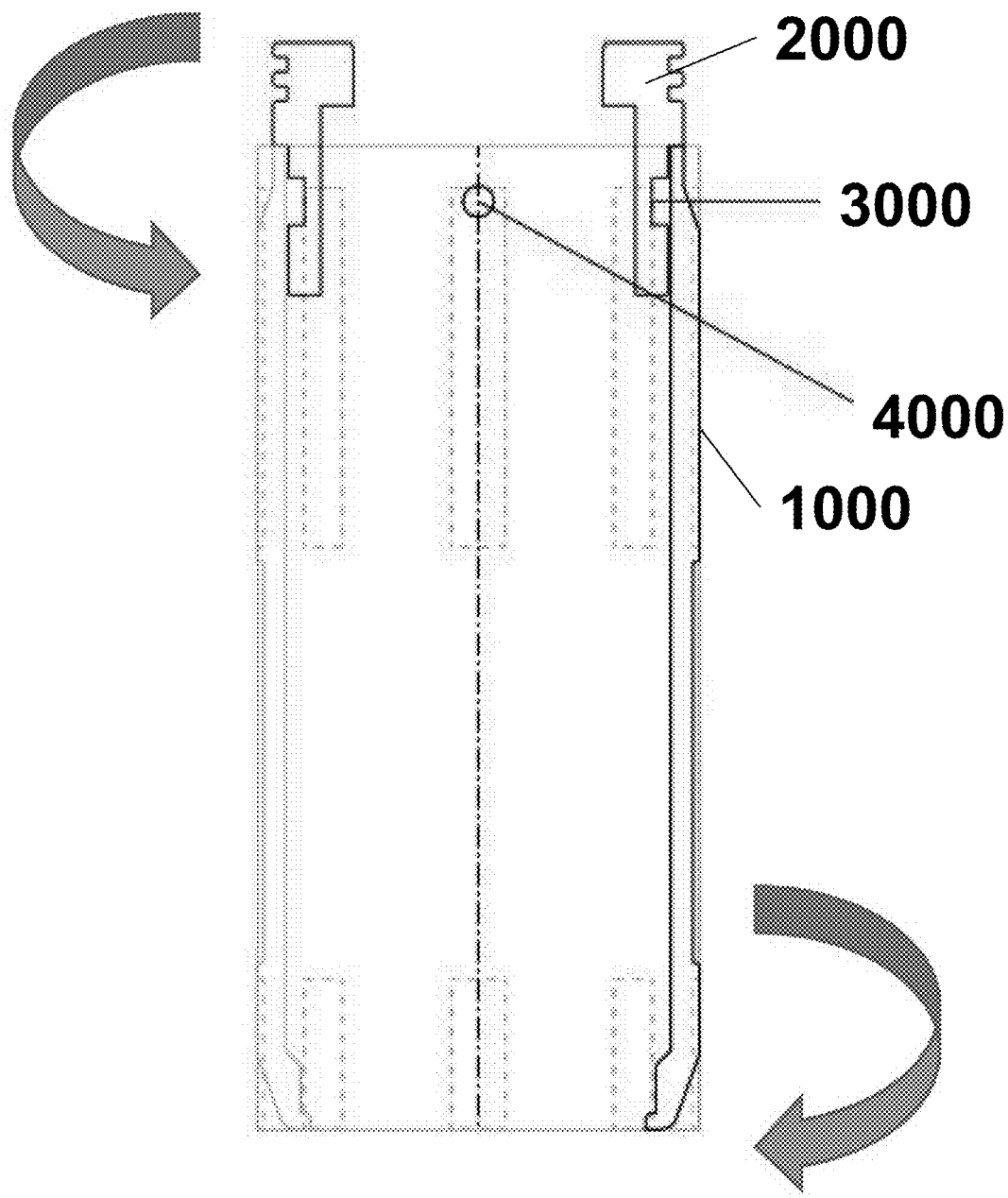
FIG. 21 illustrates a cut-away view of the environmental condition sensor device of FIG. 20.

FIG. 21 illustrates a cut-away view of the environmental condition sensor device of FIG. 20. As illustrated in FIG. 21, a freely rotatable connection between the housing 1000 and the connection member 2000 has been realized by attaching screw 4000 to C-Ring 3000 such that the housing 1000 can rotate freely of the connection member 2000 or remain stationary when the connection member 2000 is rotated, thereby preventing damage to components and assemblies within the housing 1000 if rotational force is applied to the housing 1000.

In summary, an environmental condition sensor device, comprises a microprocessor; a condition sensor, operatively connected to the microprocessor, to measure a condition of a system being monitored; and an optical output interface, operatively connected to the microprocessor, to produce light to optically communicate a measured condition of the system being monitored.

The condition sensor may measure a pressure of the system being monitored.

The condition sensor may measure a temperature of the system being monitored.

The environmental condition sensor device may also include an environment condition sensor, operatively connected to the microprocessor, to measure an environment condition being experienced by the environmental condition sensor device.

The optical output interface may produce light to optically communicate a measured environment condition being experienced by the environmental condition sensor device.

The environment condition sensor may measure a temperature being experienced by the environmental condition sensor device.

The environment condition sensor may measure a pressure being experienced by the environmental condition sensor device.

The environment condition sensor may measure vibrations being experienced by the environmental condition sensor device.

The condition sensor may include sensor components.

The microprocessor may determine if each sensor component is operationally compliant.

The optical output interface may produce a first light to optically communicate that the condition sensor is operational when the microprocessor determines that each sensor component is operationally compliant.

The optical output interface may produce a second light to optically communicate that the condition sensor is non-operational when the microprocessor determines a sensor component is not operationally compliant.

An environmental condition sensor device comprises a microprocessor; a condition sensor, operatively connected to the microprocessor, to measure a condition of a system being monitored; and an optical output interface operatively connected to the microprocessor, to produce light to optically communicate a status of the environmental condition sensor device; the condition sensor including sensor components; the microprocessor determining if each sensor component of the condition sensor is operationally compliant; the optical output interface producing a first colored light to optically communicate a status of the environmental condition sensor device is operational when the microprocessor determines that each sensor component is operationally compliant.

The optical output interface may produce a second colored light to optically communicate a status of the environmental condition sensor device is non-operational when the microprocessor determines a sensor component is not operationally compliant.

The optical output interface may include an optical block to visually communicate the light produced by the optical output interface to an operator observing the environmental condition sensor device.

An environmental condition sensor device comprises an environmental condition sensor housing configured to house components of the environmental condition sensor device; and an environmental condition system interface configured to connect the environmental condition sensor device to a system being monitored; the environmental condition sensor housing including a first connection interface; the environmental condition system interface including a second connection interface; the first connection interface being configured to connect with the second connection; the first connection interface and the second connection interface being configured to enable the environmental condition system interface to be independently rotatable of the environmental condition sensor housing.

The first connection interface may include a first stop and a second stop to prevent the environmental condition sensor housing from moving parallel to a central axis of the environmental condition sensor housing.

The first connection interface may include a third stop to prevent the environmental condition sensor housing from moving orthogonally to the central axis of the environmental condition sensor housing.

The second connection interface may include a protrusion located on an extension.

The second stop and the third stop may form a channel to receive the protrusion.

The protrusion may be configured to interact with the third stop to prevent the environmental condition sensor housing from moving orthogonally to the central axis of the environmental condition sensor housing.

The first connection interface may include a third stop to prevent the environmental condition sensor housing from moving orthogonally to the central axis of the environmental condition sensor housing.

The environmental condition sensor device may also include an O-ring, located between the first stop and the extension, to bias the protrusion into the channel.

The environmental condition sensor device may also include an environmental condition sensor device cap; the environmental condition sensor device cap including a third connection interface; the environmental condition sensor housing including a fourth connection interface; the fourth connection interface being configured to connect with the third connection; the fourth connection interface and the third connection interface being configured to enable the environmental condition sensor device cap to be independently rotatable of the environmental condition sensor housing.

The environmental condition sensor device cap may include a microprocessor; a condition sensor, operatively connected to the microprocessor; and an optical output interface, operatively connected to the microprocessor, to produce light.

The environmental condition sensor device cap may include an optical window allowing the light produced by the optical output interface to pass therethrough and allowing scattering of some of the light laterally so that the light can be visually perceived three-dimensionally.

The environmental condition sensor housing may include an optical ring allowing the light produced by the optical output interface to pass therethrough.

A method for testing and communicating a condition of components within environmental condition sensor device comprises (a) testing, using a microprocessor, a component of a condition sensor; (b) determining, using the microprocessor, if test data received from the component of the condition sensor is within a first predetermined range; (c) producing, using a light source, a first colored light when it is determined that test data received from the component of the condition sensor is within the first predetermined range; and (d) optically communicating, using an optical output interface, the first colored light to an observer of the environmental condition sensor device.

The method may include (e) producing, using a light source, a second colored light when it is determined that test data received from the component of the condition sensor is outside the first predetermined range; and (f) optically communicating, using an optical output interface, the second colored light to an observer of the environmental condition sensor device.

The method may include (e) producing, using a light source, a third colored light when it is determined that test data received from the component of the condition sensor is within the first predetermined range and within a second predetermined range; and (f) optically communicating, using an optical output interface, the third colored light to an observer of the environmental condition sensor device.

A method for calibrating a first pressure sensor and a second pressure sensor for a transfer station having a first pressure measuring port and a second pressure measuring port comprises (a) connecting the first pressure sensor and the second pressure sensor to the first pressure measuring port; (b) measuring, using the first pressure sensor, a pressure at the first pressure measuring port; (c) measuring, using the second pressure sensor, a pressure at the first pressure measuring port; (d) calibrating the first pressure sensor and the second pressure sensor based upon the pressure measured at the first pressure measuring port; (e) disconnecting the second pressure sensor from the first pressure measuring port; and (f) connecting the second pressure sensor to the second pressure measuring port.

A connection member of an environmental condition sensor device for monitoring conditions of a device comprises a fitting interface configured to attach to the device being monitored; a sensor interface configured to connect to a pressed fit assembled transducer; a channel; and a C-ring located in the channel.

An environmental condition sensor device comprises electronic components; an environmental condition sensor housing configured to house, internally, the electronic components; and an environmental condition system connection member configured to connect the environmental condition sensor device to a device being monitored; the environmental condition system connection member including a fitting interface configured to attach to the device being monitored, an sensor interface configured to connect to a pressed fit assembled transducer, a channel, and a C-ring located in the channel; the C-ring being configured to enable the environmental condition sensor housing to be independently rotatable of the electronic components.

The environmental condition sensor housing may include through-holes and the C-ring may include threaded holes; the through-holes being configured to align with the threaded holes.

The environmental condition sensor device may also include screws to connect, via the through-holes and the threaded holes, the environmental condition sensor housing to the C-ring.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A sensor device for measuring condition of a system being monitored by the sensor device, comprising:
   a housing configured to be operatively connect to the system being monitored by the sensor device;
   a microprocessor located in said housing;
   a system environmental condition sensor, located in said housing and operatively connected to said microprocessor, to measure an environmental condition within the system being monitored;
   a sensor device environmental condition sensor, located in said housing and operatively connected to said microprocessor, to measure an environmental condition within the sensor device; and an optical output interface, located in said housing and operatively connected to said microprocessor, to produce a light to optically communicate the measured environmental condition within the sensor device;

said microprocessor, in response to said measured environmental condition within the sensor device, determining a compliance status of said system environmental condition sensor, said determined compliance status indicating whether said system environmental condition sensor is in operational compliance;

said optical output interface producing the light to optically communicate said determined compliance status of said system environmental condition sensor;

said system environmental sensor being configured to interface with environmental conditions within the system being monitored;

said sensor device environmental condition sensor being configured to interface with environmental conditions within said housing of the sensor device.

2. The sensor device, as claimed in claim 1, wherein said system environmental condition sensor measures a pressure within the system being monitored.

3. The sensor device, as claimed in claim 1, wherein said system environmental condition sensor measures a temperature within the system being monitored.

4. The sensor device, as claimed in claim 1, wherein said sensor device environmental condition sensor measures a temperature within said housing of the sensor device.

5. The sensor device, as claimed in claim 1, wherein said sensor device environmental condition sensor measures a pressure within said housing of the sensor device.

6. The sensor device, as claimed in claim 1, wherein said sensor device environmental condition sensor measures vibrations within said housing of the sensor device.

7. The sensor device, as claimed in claim 1, wherein said microprocessor determines if said system environmental condition sensor is operationally compliant;

said optical output interface producing a first light to optically communicate that said system environmental condition sensor is operational when said microprocessor determines that said system environmental sensor is operationally compliant.

8. The sensor device, as claimed in claim 7, wherein said optical output interface produces a second light to optically communicate that said system environmental condition sensor is non-operational when said microprocessor determines said system environmental sensor is not operationally compliant.

9. The sensor device, as claimed in claim 1, wherein said optical output interface includes an optical block to visually communicate the light produced by said optical output interface to an operator observing sensor device.

10. A sensor device, for measuring condition of a system being monitored by the sensor device, comprising:
a housing configured to be operatively connect to the system being monitored by the sensor device;
a microprocessor located in said housing;
a system environmental condition sensor, located in said housing and operatively connected to said microprocessor, to measure an environmental condition within the system being monitored;
a sensor device environmental condition sensor, located in said housing and operatively connected to said microprocessor, to measure an environmental condition within the sensor device; and an optical output interface, operatively connected to said microprocessor, to produce light to optically communicate a status of the sensor device;

said system environmental condition sensor including a plurality of sensor components;

said microprocessor, in response to said measured environmental condition within the sensor device, determining a compliance status, said determined compliance status indicating if each sensor component of said plurality of sensor components of said system environmental condition sensor is operationally compliant;

said optical output interface producing a first colored light to optically communicate said determined compliance a status of the sensor device being operational when said microprocessor determines that each sensor component of said plurality of sensor components of said system environmental condition sensor is operationally compliant.

11. The sensor device, as claimed in claim 10, wherein said optical output interface produces a second colored light to optically communicate a status of the sensor device being non-operational when said microprocessor determines a sensor component of said plurality of sensor components is not operationally compliant.

12. The sensor device, as claimed in claim 10, wherein said optical output interface includes an optical block to visually communicate the light produced by said optical output interface to an operator observing the sensor device.

13. A sensor device, for measuring condition of a system being monitored by the sensor device, comprising:
an environmental condition sensor housing configured to house components of the sensor device; and
an environmental condition system interface housing configured to connect the sensor device to the system being monitored by the sensor device;
said environmental condition sensor housing including a first connection interface;
said environmental condition system interface housing including a second connection interface;
said environmental condition system interface housing including a third connection interface;
said first connection interface of said environmental condition sensor housing being configured to connect with said second connection of said environmental condition system interface housing;
said third connection interface of said environmental condition system interface housing being configured to connect the sensor device to the system being monitored by the sensor device;
said first connection interface of said environmental condition sensor housing and said second connection interface of said environmental condition system interface housing being configured to enable said environmental condition system interface housing to be independently rotatable of said environmental condition sensor housing.

14. The sensor device, as claimed in claim 13, wherein said first connection interface of said environmental condition sensor housing includes a first stop and a second stop to prevent said environmental condition sensor housing from moving parallel to a central axis of said environmental condition sensor housing;
said first connection interface of said environmental condition sensor housing including a third stop to prevent said environmental condition sensor housing from moving orthogonally to the central axis of said environmental condition sensor housing.

15. The sensor device, as claimed in claim 13, wherein said second connection interface of said environmental condition system interface housing includes a protrusion located on an extension.

16. The sensor device, as claimed in claim 14, wherein said second connection interface includes a protrusion located on an extension;
- said second stop and said third stop forming a channel to receive said protrusion;
- said protrusion being configured to interact with said third stop to prevent said environmental condition sensor housing from moving orthogonally to the central axis of said environmental condition sensor housing.

17. The sensor device, as claimed in claim 16, further comprising:
- an O-ring, located between said first stop and said extension, to bias said protrusion into said channel.

18. The sensor device, as claimed in claim 13, further comprising:
- an environmental condition sensor device cap;
- said environmental condition sensor device cap including a fourth connection interface;
- said environmental condition sensor housing including a fifth connection interface;
- said fifth connection interface of said environmental condition sensor housing being configured to connect with said fourth connection of said environmental condition sensor device cap;
- said fifth connection interface of said environmental condition sensor housing and said fourth connection interface of said environmental condition sensor device cap being configured to enable said environmental condition sensor device cap to be independently rotatable of said environmental condition sensor housing.

19. The sensor device, as claimed in claim 18, wherein said environmental condition sensor device cap includes a microprocessor; a condition sensor, operatively connected to said microprocessor; and an optical output interface, operatively connected to said microprocessor, to produce light.

20. The sensor device, as claimed in claim 18, wherein said environmental condition sensor device cap includes an optical window allowing the light produced by said optical output interface to pass therethrough and allowing scattering of some of the light laterally so that the light can be visually perceived three-dimensionally.

21. The sensor device, as claimed in claim 18, wherein said environmental condition sensor housing includes an optical ring allowing the light produced by said optical output interface to pass therethrough.

* * * * *